(12) United States Patent
Rufitskiy et al.

(10) Patent No.: US 12,439,030 B2
(45) Date of Patent: Oct. 7, 2025

(54) LUMA MAPPING FOR TEMPLATE MATCHING

(71) Applicant: Comcast Cable Communications, LLC, Philadelphia, PA (US)

(72) Inventors: Vasily Alexeevich Rufitskiy, Vladimir (RU); Alexey Konstantinovich Filippov, Khimki (RU); Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/405,555

(22) Filed: Jan. 5, 2024

(65) Prior Publication Data

US 2024/0244180 A1    Jul. 18, 2024

Related U.S. Application Data

(60) Provisional application No. 63/437,887, filed on Jan. 9, 2023, provisional application No. 63/437,353, filed on Jan. 5, 2023.

(51) Int. Cl.

| | |
|---|---|
| *H04N 7/12* | (2006.01) |
| *H04N 19/105* | (2014.01) |
| *H04N 19/159* | (2014.01) |
| *H04N 19/167* | (2014.01) |
| *H04N 19/174* | (2014.01) |
| *H04N 19/176* | (2014.01) |

(52) U.S. Cl.
CPC ......... *H04N 19/105* (2014.11); *H04N 19/159* (2014.11); *H04N 19/167* (2014.11); *H04N 19/174* (2014.11); *H04N 19/176* (2014.11)

(58) Field of Classification Search
CPC .................................................. H04N 19/105
See application file for complete search history.

(56) References Cited

U.S. PATENT DOCUMENTS

| | | |
|---|---|---|
| 2022/0109853 A1 | 4/2022 | Zhang et al. |
| 2022/0329828 A1 | 10/2022 | Zhao et al. |

OTHER PUBLICATIONS

JVET-O0190-v1, Joint Video Experts Team (JVET) of ITU-T SG 16 WP 3 and ISO/IEC JTC 1/SC 29/WG 11 15th Meeting: Gothenburg, SE, Jul. 3-12, 2019, Source: Ittiam Systems Pvt. Ltd, Title: Non-CE4: LIC model parameters using forward mapped luma samples in LMCS.
JVET-Y0088-v1, Joint Video Experts Team (JVET) of ITU-T SG 16 WP 3 and ISO/IEC JTC 1/SC 29 25th Meeting, by teleconference, Jan. 12-21, 2022, Source: InterDigital, Title: EE2-related: IBC with Template Matching.

(Continued)

*Primary Examiner* — Y Lee
(74) *Attorney, Agent, or Firm* — Banner & Witcoff, Ltd.

(57) ABSTRACT

The current block may be predicted using a reference block and a difference between templates of the current bock and the reference block. The reference block may be selected from a plurality of candidate reference blocks. The selection may be based on a template matching cost that indicates the differences between the templates of the current block and the templates of a respective candidate reference block. An encoder or a decoder may transform samples from templates of the current block and of the candidate reference block into the same domain, for example, if the samples are in different domains before determining the template matching cost.

20 Claims, 26 Drawing Sheets

(56) References Cited

OTHER PUBLICATIONS

JVET-AB2025, Joint Video Experts Team (JVET) of ITU-T SG 16 WP 3 and ISO/IEC JTC 1/SC 29 28th Meeting, Mainz, DE, Oct. 20-28, 2022, Source: Editors, Title: Algorithm Description of Enhanced Compression Model 7 (ECM 7).

Jun. 3, 2024—European Search Report—EP Application No. 24150587.4.

Marta Karczewicz, et al. "VVC In-Loop Filters" IEEE Transactions on Circuits and Systems for Video Technology, vol. 31, No. 10, Oct. 2021.

JVET-AB0094-v1, Joint Video Experts Team (JVET) of ITU-T SG 16 WP 3 and ISO/IEC JTC 1/SC 29 28th Meeting, Mainz, DE, Oct. 20-28, 2022, Source: Xidian University, Guangdong OPPO Mobile Telecommunications Corp., Ltd, Title: Non-EE2: Direct block vector (DBV) mode for chroma prediction.

JVET-AC0071-v1, Joint Video Experts Team (JVET) of ITU-T SG 16 WP 3 and ISO/IEC JTC 1/SC 29 29th Meeting, by teleconference, Jan. 11-20, 2023, Source: Xidian University, Guangdong OPPO Mobile Telecommunications Corp., Ltd, Title: EE2-3.1: Direct block vector mode for chroma prediction.

JVET-AC0080-v1, Joint Video Experts Team (JVET) of ITU-T SG 16 WP 3 and ISO/IEC JTC 1/SC 29 29th Meeting, by teleconference, Jan. 11-20, 2023, Source: Tencent, Title: EE2-3.7: Chroma IBC method as in VTM-5.0.

JVET-AC0119-v1, Joint Video Experts Team (JVET) of ITU-T SG 16 WP 3 and ISO/IEC JTC 1/SC 29 29th Meeting, by teleconference, Jan. 11-20, 2023, Source: vivo Mobile Communication Co., Ltd, Title: EE2-1.6: On Chroma Fusion improvement.

JVET-AC125-v1, Joint Video Experts Team (JVET) of ITU-T SG 16 WP 3 and ISO/IEC JTC 1/SC 29 29th Meeting, by teleconference, Jan. 11-20, 2023, Source: Tencent, Xidian University, Guangdong OPPO Mobile Telecommunications Corp., Ltd, Title: EE2-3.8: Combination of chroma IBC tests.

JVET-AC0138-v1, Joint Video Experts Team (JVET) of ITU-T SG 16 WP 3 and ISO/IEC JTC 1/SC 29 29th Meeting, by teleconference, Jan. 11-20, 2023, Source: InterDigital, Title: Adjusting luma/chroma BD-rate balance in ECM.

JVET-AC0147-v1, Joint Video Experts Team (JVET) of ITU-T SG 16 WP 3 and ISO/IEC JTC 1/SC 29 29th Meeting, by teleconference, Jan. 11-20, 2023, Source:Kwai Inc. and Qualcomm Incorporated, Title: EE2-1.13 and 1.14: CCCM using non-downsampled luma samples.

FIG. 16

LUMA MAPPING FOR TEMPLATE MATCHING

CROSS-REFERENCE TO RELATED APPLICATIONS

The application claims the benefit of U.S. Provisional Application No. 63/437,353 filed on Jan. 5, 2023, and U.S. Provisional Application No. 63/437,887 filed on Jan. 9, 2023. The above-referenced applications are hereby incorporated by reference in their entirety.

BACKGROUND

Intra block copy (IBC) may be used to predict a current block. The current block may be predicted using a reference block and a difference between templates of the current block and the reference block.

SUMMARY

The following summary presents a simplified summary of certain features. The summary is not an extensive overview and is not intended to identify key or critical elements.

Intra block copy (IBC) may be used when coding (e.g., encoding or decoding) a current block within a picture to reduce the amount of data to be sent. The current block may be predicted based on a difference between templates of the current block and templates of a reference block. The reference block may be selected from a plurality of candidate reference blocks. The selection may be based on a template matching cost indicating differences between the templates of the current block and the templates of a respective candidate reference block. Samples from templates of the current block may be mapped to a luma domain different from those of a candidate reference block. Instead of determining a template matching cost based on samples in different domains, an encoder or a decoder may transform samples from templates of the current block and templates of the candidate reference block into the same domain, for example, before determining a template matching cost. In this way, the template matching cost may indicate the difference between the current block and the candidate reference block more accurately, resulting in a more efficient encoding or decoding of the current block.

These and other features and advantages are described in greater detail below.

BRIEF DESCRIPTION OF THE DRAWINGS

Examples of several of the various embodiments of the present disclosure are described herein with reference to the drawings.

FIG. 16 shows an example of intra block copy (IBC) for encoding.

DETAILED DESCRIPTION

Figure 1:
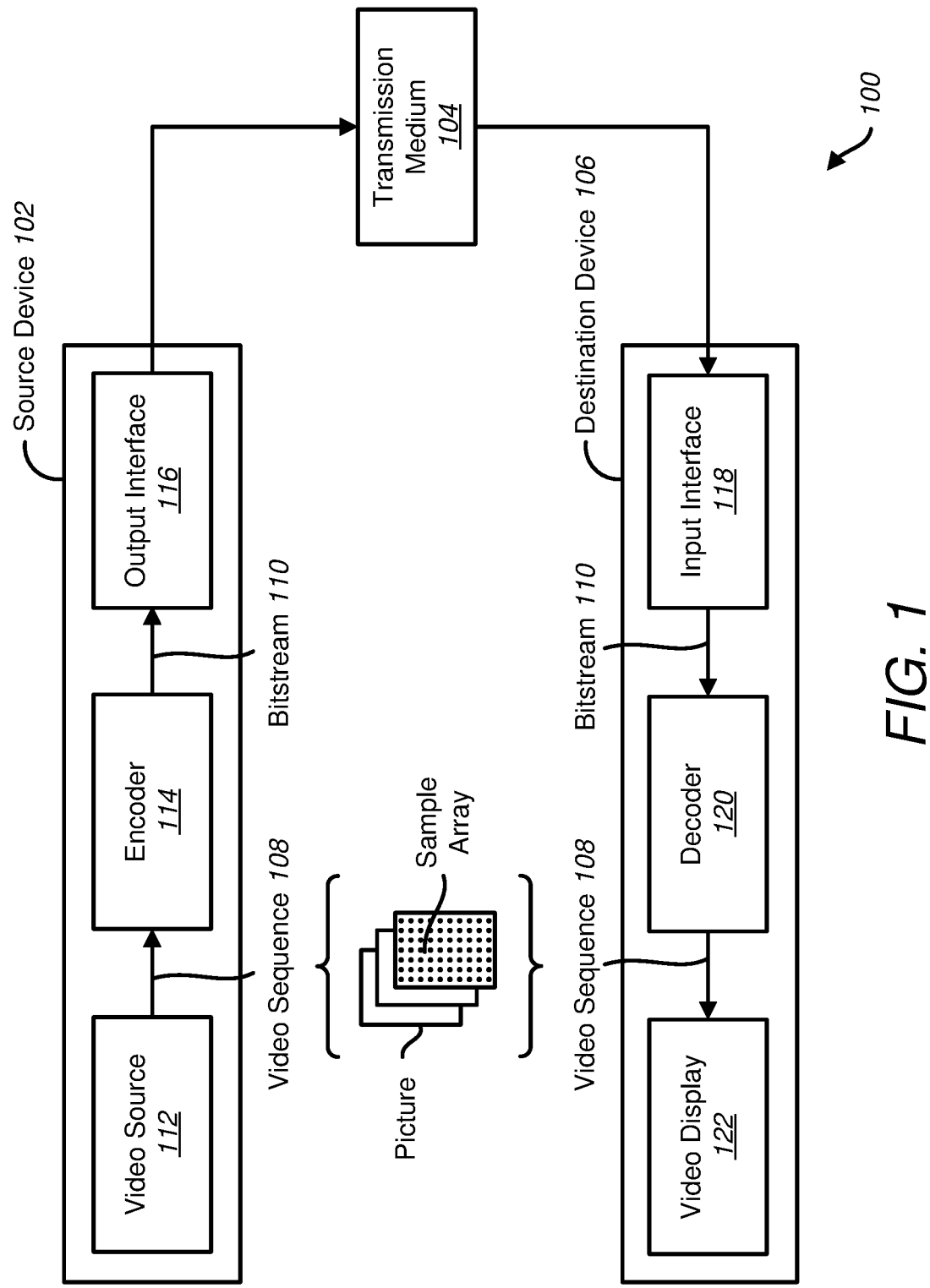
FIG. 1 shows an example video coding/decoding system.

The accompanying drawings and descriptions provide examples. It is to be understood that the examples shown in the drawings and/or described are non-exclusive, and that features shown and described may be practiced in other examples. Examples are provided for operation of video encoding and decoding systems, which may be used in the technical field of video data storage and/or transmission/reception. More particularly, the technology disclosed herein may relate to video compression as used in encoding and/or decoding devices and/or systems.

A video sequence, comprising multiple pictures/frames, may be represented in digital form for storage and/or transmission. Representing a video sequence in digital form may require a large quantity of bits. Large data sizes that may be associated with video sequences may require significant resources for storage and/or transmission. Video encoding may be used to compress a size of a video sequence for more efficient storage and/or transmission. Video decoding may be used to decompress a compressed video sequence for display and/or other forms of consumption.

FIG. 1 shows an example video coding/decoding system. Video coding/decoding system 100 may comprise a source device 102, a transmission medium 104, and a destination device 106. The source device 102 may encode a video sequence 108 into a bitstream 110 for more efficient storage and/or transmission. The source device 102 may store and/or send/transmit the bitstream 110 to the destination device 106 via the transmission medium 104. The destination device 106 may decode the bitstream 110 to display the video sequence 108. The destination device 106 may receive the bitstream 110 from the source device 102 via the transmission medium 104. The source device 102 and/or the destination device 106 may be any of a plurality of different devices (e.g., a desktop computer, laptop computer, tablet computer, smart phone, wearable device, television, camera, video gaming console, set-top box, video streaming device, etc.).

The source device 102 may comprise (e.g., for encoding the video sequence 108 into the bitstream 110) one or more of a video source 112, an encoder 114, and/or an output interface 116. The video source 112 may provide and/or generate the video sequence 108 based on a capture of a natural scene and/or a synthetically generated scene. A synthetically generated scene may be a scene comprising computer generated graphics and/or screen content. The video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A video sequence, such as video sequence 108, may comprise a series of pictures (also referred to as frames). A video sequence may achieve an impression of motion based on successive presentation of pictures of the video sequence using a constant time interval or variable time intervals between the pictures. A picture may comprise one or more sample arrays of intensity values. The intensity values may be taken (e.g., measured, determined, provided) at a series of regularly spaced locations within a picture. A color picture may comprise (e.g., typically comprises) a luminance sample array and two chrominance sample arrays. The luminance sample array may comprise intensity values representing the brightness (e.g., luma component, Y) of a picture. The chrominance sample arrays may comprise intensity values that respectively represent the blue and red components of a picture (e.g., chroma components, Cb and Cr) separate from the brightness. Other color picture sample arrays may be possible based on different color schemes (e.g., a red, green, blue (RGB) color scheme). A pixel, in a color picture, may refer to/comprise/be associated with all intensity values (e.g., luma component, chroma components), for a given location, in the sample arrays used to represent color pictures. A monochrome picture may comprise a single, luminance sample array. A pixel, in a monochrome picture, may refer to/comprise/be associated with the intensity value (e.g., luma component) at a given location in the single, luminance sample array used to represent monochrome pictures.

The encoder 114 may encode the video sequence 108 into the bitstream 110. The encoder 114 may apply/use (e.g., to encode the video sequence 108) one or more prediction techniques to reduce redundant information in the video sequence 108. Redundant information may comprise information that may be predicted at a decoder and need not be transmitted to the decoder for accurate decoding of the video sequence 108. For example, the encoder 114 may apply spatial prediction (e.g., intra-frame or intra prediction), temporal prediction (e.g., inter-frame prediction or inter prediction), inter-layer prediction, and/or other prediction techniques to reduce redundant information in the video sequence 108. The encoder 114 may partition pictures comprising the video sequence 108 into rectangular regions referred to as blocks, for example, prior to applying one or more prediction techniques. The encoder 114 may then encode a block using the one or more of the prediction techniques.

The encoder 114 may search for a block similar to the block being encoded in another picture (e.g., a reference picture) of the video sequence 108, for example, for temporal prediction. The block determined during the search (e.g., a prediction block) may then be used to predict the block being encoded. The encoder 114 may form a prediction block based on data from reconstructed neighboring samples of the block to be encoded within the same picture of the video sequence 108, for example, for spatial prediction. A reconstructed sample may be a sample that was encoded and then decoded. The encoder 114 may determine a prediction error (e.g., a residual) based on the difference between a block being encoded and a prediction block. The prediction error may represent non-redundant information that may be sent/transmitted to a decoder for accurate decoding of the video sequence 108.

The encoder 114 may apply a transform to the prediction error (e.g. using a discrete cosine transform (DCT), or any other transform) to generate transform coefficients. The encoder 114 may form the bitstream 110 based on the transform coefficients and other information used to determine prediction blocks using/based on prediction types, motion vectors, and prediction modes. The encoder 114 may perform one or more of quantization and entropy coding of the transform coefficients and/or the other information used to determine the prediction blocks, for example, prior to forming the bitstream 110. The quantization and/or the entropy coding may further reduce the quantity of bits needed to store and/or transmit the video sequence 108.

The output interface 116 may be configured to write and/or store the bitstream 110 onto the transmission medium 104 for transmission to the destination device 106. The output interface 116 may be configured to send/transmit, upload, and/or stream the bitstream 110 to the destination device 106 via the transmission medium 104. The output interface 116 may comprise a wired and/or a wireless transmitter configured to send/transmit, upload, and/or stream the bitstream 110 in accordance with one or more proprietary, open-source, and/or standardized communication protocols (e.g., Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, Wireless Application Protocol (WAP) standards, and/or any other communication protocol).

The transmission medium 104 may comprise wireless, wired, and/or computer readable medium. For example, the transmission medium 104 may comprise one or more wires, cables, air interfaces, optical discs, flash memory, and/or magnetic memory. The transmission medium 104 may comprise one or more networks (e.g., the internet) or file servers configured to store and/or send/transmit encoded video data.

The destination device 106 may decode the bitstream 110 into the video sequence 108 for display. The destination device 106 may comprise one or more of an input interface 118, a decoder 120, and/or a video display 122. The input interface 118 may be configured to read the bitstream 110 stored on the transmission medium 104 by the source device 102. The input interface 118 may be configured to receive, download, and/or stream the bitstream 110 from the source device 102 via the transmission medium 104. The input interface 118 may comprise a wired and/or a wireless receiver configured to receive, download, and/or stream the bitstream 110 in accordance with one or more proprietary, open-source, standardized communication protocols, and/or any other communication protocol (e.g., such as referenced herein).

The decoder 120 may decode the video sequence 108 from the encoded bitstream 110. The decoder 120 may generate prediction blocks for pictures of the video sequence 108 in a similar manner as the encoder 114 and determine the prediction errors for the blocks, for example, to decode the video sequence 108. The decoder 120 may generate the prediction blocks using/based on prediction types, prediction modes, and/or motion vectors received in the bitstream 110. The decoder 120 may determine the prediction errors using the transform coefficients received in the bitstream 110. The decoder 120 may determine the prediction errors by weighting transform basis functions using the transform coefficients. The decoder 120 may combine the prediction blocks and the prediction errors to decode the video sequence 108. The video sequence 108 at the destination device 106 may be, or may not necessarily be, the same video sequence sent, such as the video sequence 108 as sent by the source device 102. The decoder 120 may decode a video sequence that approximates the video sequence 108, for example, because of lossy compression of the video sequence 108 by the encoder 114 and/or errors introduced into the encoded bitstream 110 during transmission to the destination device 106.

The video display 122 may display the video sequence 108 to a user. The video display 122 may comprise a cathode rate tube (CRT) display, a liquid crystal display (LCD), a plasma display, a light emitting diode (LED) display, and/or any other display device suitable for displaying the video sequence 108.

The video encoding/decoding system 100 is merely an example and video encoding/decoding systems different from the video encoding/decoding system 100 and/or modified versions of the video encoding/decoding system 100 may perform the methods and processes as described herein. For example, the video encoding/decoding system 100 may comprise other components and/or arrangements. The video source 112 may be external to the source device 102. The video display device 122 may be external to the destination device 106 or omitted altogether (e.g., if the video sequence 108 is intended for consumption by a machine and/or storage device). The source device 102 may further comprise a video decoder and the destination device 104 may further comprise a video encoder. For example, the source device 102 may be configured to further receive an encoded bit stream from the destination device 106 to support two-way video transmission between the devices.

The encoder 114 and/or the decoder 120 may operate according to one or more proprietary or industry video coding standards. For example, the encoder 114 and/or the decoder 120 may operate in accordance with one or more proprietary, open-source, and/or standardized protocols (e.g., International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC)), ITU-T H.265 and MPEG-I Part 3 (also known as Versatile Video Coding (VVC)), the WebM VP8 and VP9 codecs, and/or AOMedia Video 1 (AV1), and/or any other vidco coding protocol).

Figure 2:
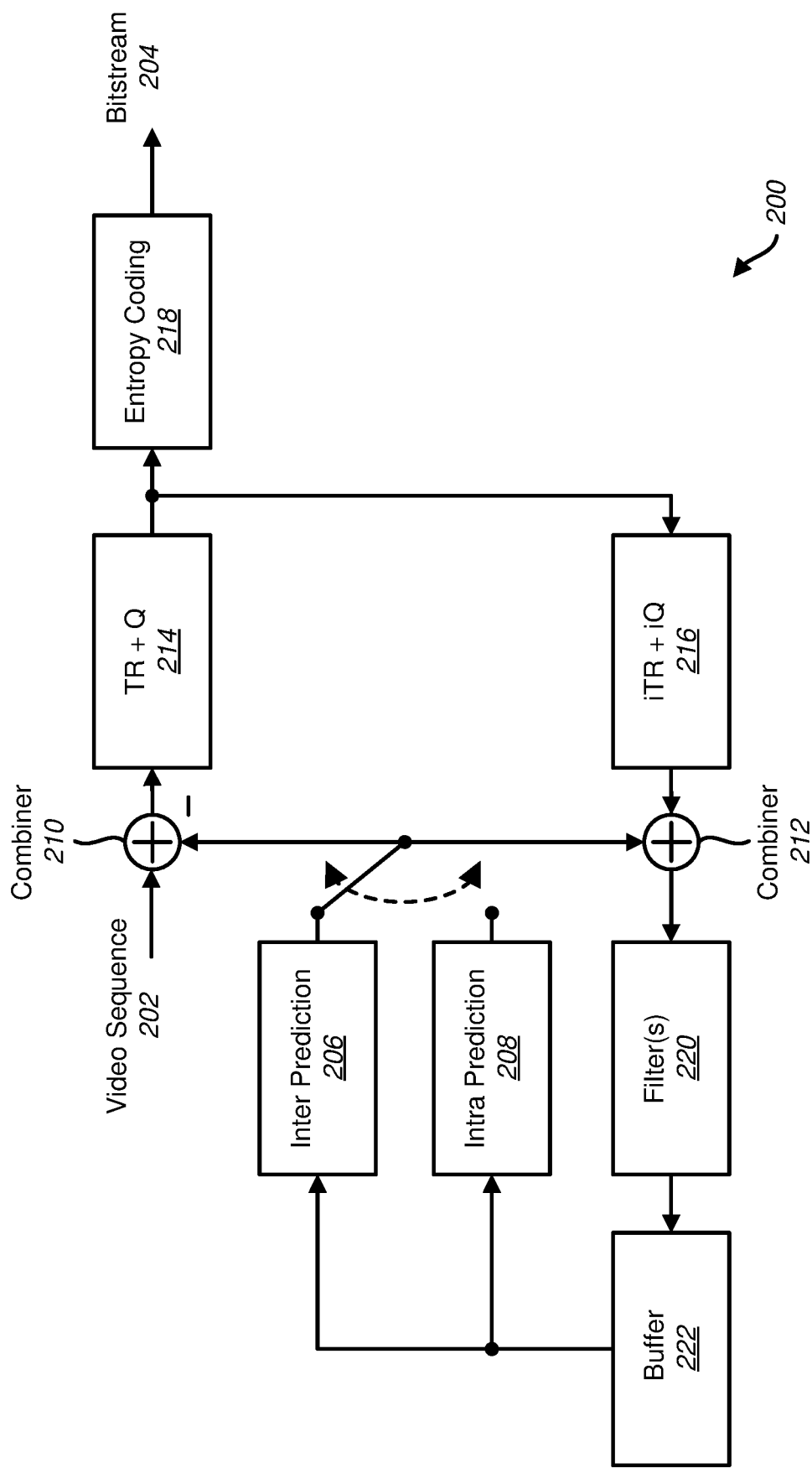
FIG. 2 shows an example encoder.

FIG. 2 shows an example encoder. The encoder 200 as shown in FIG. 2 may implement one or more processes described herein. The encoder 200 may encode a video sequence 202 into a bitstream 204 for more efficient storage and/or transmission. The encoder 200 may be implemented in the video coding/decoding system 100 as shown in FIG. 1 (e.g., as the encoder 114) or in any computing, communication, or electronic device (e.g., desktop computer, laptop computer, tablet computer, smart phone, wearable device, television, camera, video gaming console, set-top box, video streaming device, etc.). The encoder 200 may comprise one or more of an inter prediction unit 206, an intra prediction unit 208, combiners 210 and 212, a transform and quantization unit (TR+Q) 214, an inverse transform and quantization unit (iTR+iQ) 216, an entropy coding unit 218, one or more filters 220, and/or a buffer 222.

The encoder 200 may partition pictures (e.g., frames) of (e.g., comprising) the video sequence 202 into blocks and encode the video sequence 202 on a block-by-block basis. The encoder 200 may perform/apply a prediction technique on a block being encoded using either the inter prediction unit 206 or the intra prediction unit 208. The inter prediction unit 206 may perform inter prediction by searching for a block similar to the block being encoded in another, reconstructed picture (e.g., a reference picture) of the video sequence 202. The reconstructed picture may be a picture that was encoded and then decoded. The block determined during the search (e.g., a prediction block) may then be used to predict the block being encoded to remove redundant information. The inter prediction unit 206 may exploit temporal redundancy or similarities in scene content from picture to picture in the video sequence 202 to determine the prediction block. For example, scene content between pictures of the video sequence 202 may be similar except for differences due to motion and/or affine transformation of the screen content over time.

The intra prediction unit 208 may perform intra prediction by forming a prediction block based on data from reconstructed neighboring samples of the block to be encoded within the same picture of the video sequence 202. The reconstructed sample may be a sample that was encoded and then decoded. The intra prediction unit 208 may exploit spatial redundancy or similarities in scene content within a picture of the video sequence 202 to determine the prediction block. For example, the texture of a region of scene content in a picture may be similar to the texture in the immediate surrounding area of the region of the scene content in the same picture.

The combiner 210 may determine a prediction error (e.g., a residual) based on the difference between the block being encoded and the prediction block. The prediction error may represent non-redundant information that may be sent/transmitted to a decoder for accurate decoding of the video sequence 202.

The transform and quantization unit (TR+Q) 214 may transform and quantize the prediction error. The transform and quantization unit 214 may transform the prediction error into transform coefficients by applying, for example, a DCT to reduce correlated information in the prediction error. The transform and quantization unit 214 may quantize the coefficients by mapping data of the transform coefficients to a predefined set of representative values. The transform and quantization unit 214 may quantize the coefficients to reduce irrelevant information in the bitstream 204. The Irrelevant information may be information that may be removed from the coefficients without producing visible and/or perceptible distortion in the video sequence 202 after decoding (e.g., at a receiving device).

The entropy coding unit 218 may apply one or more entropy coding methods to the quantized transform coefficients to further reduce the bit rate. For example, the entropy coding unit 218 may apply context adaptive variable length coding (CAVLC), context adaptive binary arithmetic coding (CABAC), and/or syntax-based context-based binary arithmetic coding (SBAC). The entropy coded coefficients may be packed to form the bitstream 204.

The inverse transform and quantization unit (iTR+iQ) 216 may inverse quantize and inverse transform the quantized transform coefficients to determine a reconstructed prediction error. The combiner 212 may combine the reconstructed prediction error with the prediction block to form a reconstructed block. The filter(s) 220 may filter the reconstructed block, for example, using a deblocking filter and/or a sample-adaptive offset (SAO) filter. The buffer 222 may store the reconstructed block for prediction of one or more other blocks in the same and/or different picture of the video sequence 202.

The encoder 200 may further comprise an encoder control unit. The encoder control unit may be configured to control one or more units of the encoder 200 as shown in FIG. 2. The encoder control unit may control the one or more units of the encoder 200 such that the bitstream 204 may be generated in conformance with the requirements of one or more proprietary coding protocols, industry video coding standards, and/or any other video cording protocol. For example, the encoder control unit may control the one or more units of the encoder 200 such that bitstream 204 may be generated in conformance with one or more of ITU-T H.263, AVC, HEVC, VVC, VP8, VP9, AV1, and/or any other video coding standard/format.

The encoder control unit may attempt to minimize (or reduce) the bitrate of bitstream 204 and/or maximize (or increase) the reconstructed video quality (e.g., within the constraints of a proprietary coding protocol, industry video coding standard, and/or any other video cording protocol). For example, the encoder control unit may attempt to minimize or reduce the bitrate of bitstream 204 such that the reconstructed video quality may not fall below a certain level/threshold, and/or may attempt to maximize or increase the reconstructed video quality such that the bit rate of bitstream 204 may not exceed a certain level/threshold. The encoder control unit may determine/control one or more of: partitioning of the pictures of the video sequence 202 into blocks, whether a block is inter predicted by the inter prediction unit 206 or intra predicted by the intra prediction unit 208, a motion vector for inter prediction of a block, an intra prediction mode among a plurality of intra prediction modes for intra prediction of a block, filtering performed by the filter(s) 220, and/or one or more transform types and/or quantization parameters applied by the transform and quantization unit 214. The encoder control unit may determine/control one or more of the above based on a rate-distortion measure for a block or picture being encoded. The encoder control unit may determine/control one or more of the above to reduce the rate-distortion measure for a block or picture being encoded.

The prediction type used to encode a block (intra or inter prediction), prediction information of the block (intra prediction mode if intra predicted, motion vector, etc.), and/or transform and/or quantization parameters, may be sent to the entropy coding unit 218 to be further compressed (e.g., to reduce the bit rate). The prediction type, prediction information, and/or transform and/or quantization parameters may be packed with the prediction error to form the bitstream 204.

The encoder 200 is merely an example and encoders different from the encoder 200 and/or modified versions of the encoder 200 may perform the methods and processes as described herein. For example, the encoder 200 may comprise other components and/or arrangements. One or more of the components shown in FIG. 2 may be optionally included in the encoder 200 (e.g., the entropy coding unit 218 and/or the filters(s) 220).

Figure 3:
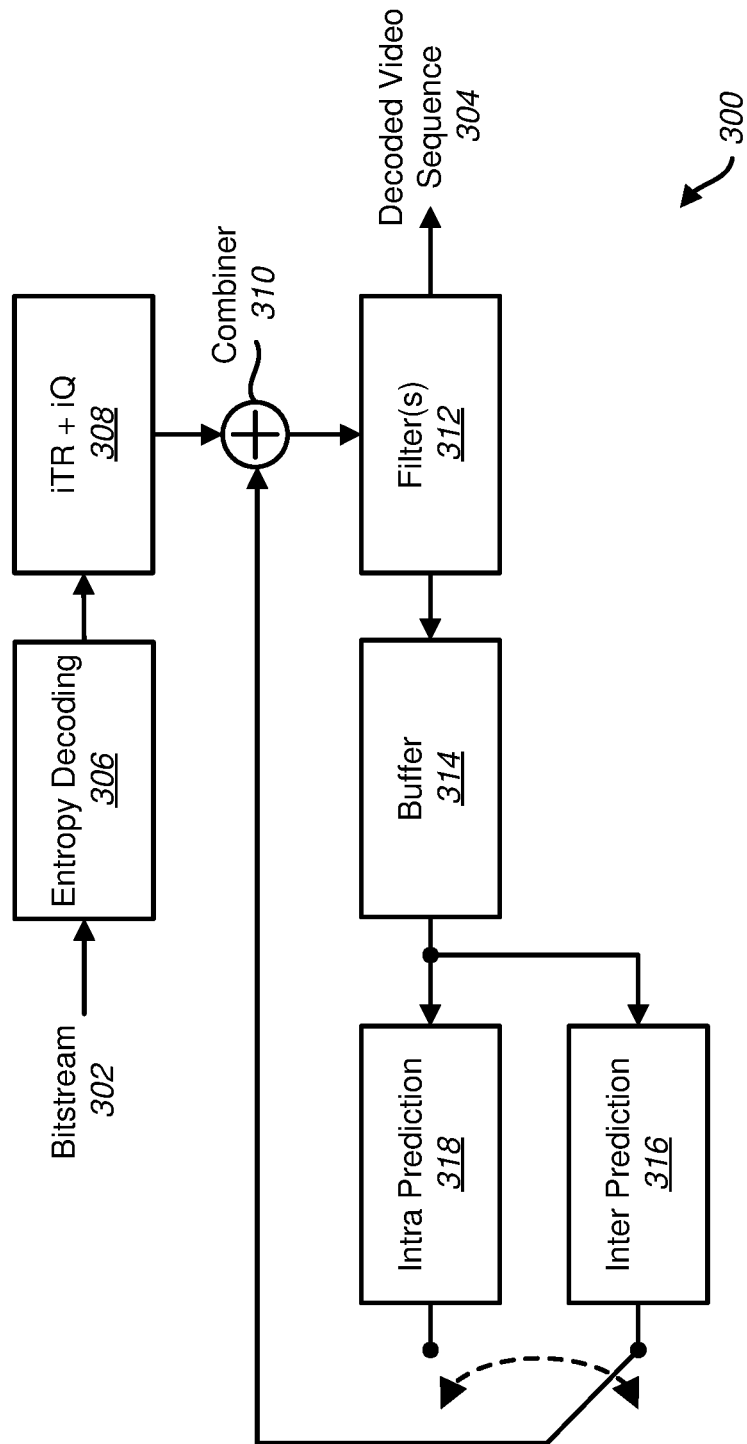
FIG. 3 shows an example decoder.

FIG. 3 shows an example decoder. A decoder 300 as shown in FIG. 3 may implement one or more processes described herein. The decoder 300 may decode a bitstream 302 into a decoded video sequence 304 for display and/or some other form of consumption. The decoder 300 may be implemented in the video encoding/decoding system 100 in FIG. 1 and/or in a computing, communication, or electronic device (e.g., desktop computer, laptop computer, tablet computer, smart phone, wearable device, television, camera, video gaming console, set-top box, and/or video streaming device). The decoder 300 may comprise an entropy decoding unit 306, an inverse transform and quantization (iTR+iQ) unit 308, a combiner 310, one or more filters 312, a buffer 314, an inter prediction unit 316, and/or an intra prediction unit 318.

The decoder 300 may comprise a decoder control unit configured to control one or more units of decoder 300. The decoder control unit may control the one or more units of decoder 300 such that the bitstream 302 is decoded in conformance with the requirements of one or more proprietary coding protocols, industry video coding standards, and/or any other communication protocol. For example, the decoder control unit may control the one or more units of decoder 300 such that the bitstream 302 is decoded in conformance with one or more of ITU-T H.263, AVC, HEVC, VVC, VP8, VP9, AV1, and/or any other video coding standard/format.

The decoder control unit may determine/control one or more of: whether a block is inter predicted by the inter prediction unit 316 or intra predicted by the intra prediction unit 318, a motion vector for inter prediction of a block, an intra prediction mode among a plurality of intra prediction modes for intra prediction of a block, filtering performed by the filter(s) 312, and/or one or more inverse transform types and/or inverse quantization parameters to be applied by the inverse transform and quantization unit 308. One or more of the control parameters used by the decoder control unit may be packed in bitstream 302.

The Entropy decoding unit 306 may entropy decode the bitstream 302. The inverse transform and quantization unit 308 may inverse quantize and/or inverse transform the quantized transform coefficients to determine a decoded prediction error. The combiner 310 may combine the decoded prediction error with a prediction block to form a decoded block. The prediction block may be generated by the intra prediction unit 318 or the inter prediction unit 316 (e.g., as described above with respect to encoder 200 in FIG. 2). The filter(s) 312 may filter the decoded block, for example, using a deblocking filter and/or a sample-adaptive offset (SAO) filter. The buffer 314 may store the decoded block for prediction of one or more other blocks in the same and/or different picture of the video sequence in the bitstream 302. The decoded video sequence 304 may be output from the filter(s) 312 as shown in FIG. 3.

The decoder 300 is merely an example and decoders different from the decoder 300 and/or modified versions of the decoder 300 may perform the methods and processes as described herein. For example, the decoder 300 may have other components and/or arrangements. One or more of the components shown in FIG. 3 may be optionally included in the decoder 300 (e.g., the entropy decoding unit 306 and/or the filters(s) 312).

Although not shown in FIGS. 2 and 3, each of the encoder 200 and the decoder 300 may further comprise an intra block copy unit in addition to inter prediction and intra prediction units. The intra block copy unit may perform/operate similar to an inter prediction unit but may predict blocks within the same picture. For example, the intra block copy unit may exploit repeated patterns that appear in screen content. The screen content may include computer generated text, graphics, animation, etc.

Video encoding and/or decoding may be performed on a block-by-block basis. The process of partitioning a picture into blocks may be adaptive based on the content of the picture. For example, larger block partitions may be used in areas of a picture with higher levels of homogeneity to improve coding efficiency.

A picture (e.g., in HEVC, or any other coding standard/format) may be partitioned into non-overlapping square blocks, which may be referred to as coding tree blocks (CTBs). The CTBs may comprise samples of a sample array. A CTB may have a size of 2n×2n samples, where n may be specified by a parameter of the encoding system. For example, n may be 4, 5, 6, or any other value. A CTB may have any other size. A CTB may be further partitioned by a recursive quadtree partitioning into coding blocks (CBs) of half vertical and half horizontal size. The CTB may form the root of the quadtree. A CB that is not split further as part of the recursive quadtree partitioning may be referred to as a leaf CB of the quadtree, and otherwise may be referred to as a non-leaf CB of the quadtree. A CB may have a minimum size specified by a parameter of the encoding system. For example, a CB may have a minimum size of 4×4, 8×8, 16×16, 32×32, 64×64 samples, or any other minimum size. A CB may be further partitioned into one or more prediction blocks (PBs) for performing inter and/or intra prediction. A PB may be a rectangular block of samples on which the same prediction type/mode may be applied. For transformations, a CB may be partitioned into one or more transform blocks (TBs). A TB may be a rectangular block of samples that may determine/indicate an applied transform size.

Figure 4:
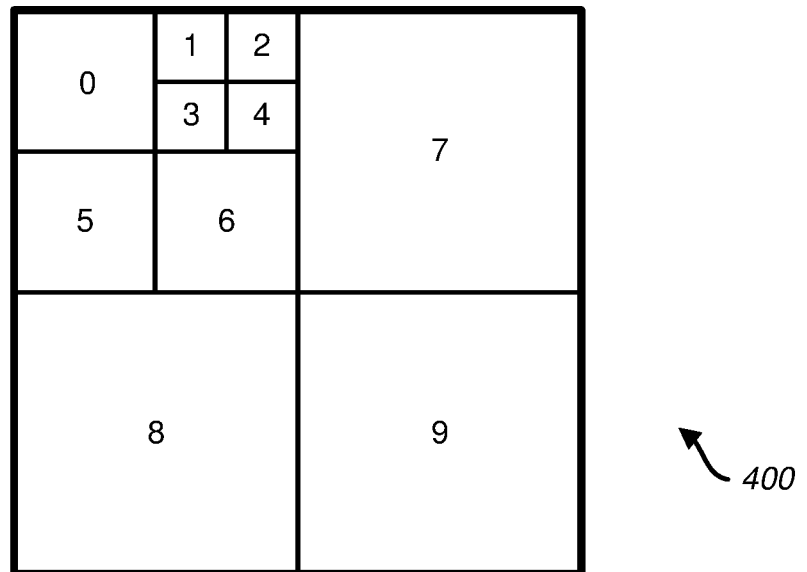
FIG. 4 shows an example quadtree partitioning of a coding tree block (CTB).
Figure 5:
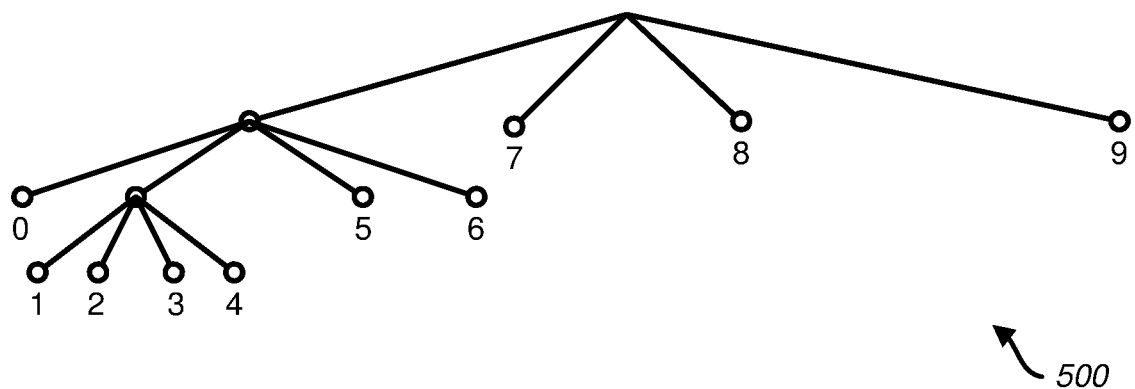
FIG. 5 shows an example quadtree corresponding to the example quadtree partitioning of the CTB in FIG. 4.

FIG. 4 shows an example quadtree partitioning of a CTB. FIG. 5 shows a quadtree corresponding to the example quadtree partitioning of the CTB 400 in FIG. 4. As shown in FIGS. 4 and 5, the CTB 400 may first be partitioned into four CBs of half vertical and half horizontal size. Three of the resulting CBs of the first level partitioning of CTB 400 may be leaf CBs. The three leaf CBs of the first level partitioning of CTB 400 are respectively labeled 7, 8, and 9 in FIGS. 4 and 5. The non-leaf CB of the first level partitioning of CTB 400 may be partitioned into four sub-CBs of half vertical and half horizontal size. Three of the resulting sub-CBs of the second level partitioning of CTB 400 may be leaf CBs. The three leaf CBs of the second level partitioning of CTB 400 are respectively labeled 0, 5, and 6 in FIGS. 4 and 5. The non-leaf CB of the second level partitioning of CTB 400 may be partitioned into four leaf CBs of half vertical and half horizontal size. The four leaf CBs may be respectively labeled 1, 2, 3, and 4 in FIGS. 4 and 5.

The CTB 400 of FIG. 4 may be partitioned into 10 leaf CBs respectively labeled 0-9, and/or any other quantity of leaf CBs. The 10 leaf CBs may correspond to 10 CB leaf nodes (e.g., 10 CB leaf nodes of the quadtree 500 as shown in FIG. 5). In other examples, a CTB may be partitioned into a different number of leaf CBs. The resulting quadtree partitioning of the CTB 400 may be scanned using a z-scan (e.g., left-to-right, top-to-bottom) to form the sequence order for encoding/decoding the CB leaf nodes. A numeric label (e.g., indicator, index) of each CB leaf node in FIGS. 4 and 5 may correspond to the sequence order for encoding/decoding. For example, CB leaf node 0 may be encoded/decoded first and CB leaf node 9 may be encoded/decoded last. Although not shown in FIGS. 4 and 5, each CB leaf node may comprise one or more PBs and/or TBs.

A picture, in VVC (or in any other coding standard/format), may be partitioned in a similar manner (such as in HEVC). A picture may be first partitioned into non-overlapping square CTBs. The CTBs may then be partitioned, using a recursive quadtree partitioning, into CBs of half vertical and half horizontal size. A quadtree leaf node (e.g., in VVC) may be further partitioned by a binary tree or ternary tree partitioning (or any other partitioning) into CBs of unequal sizes.

Figure 6:
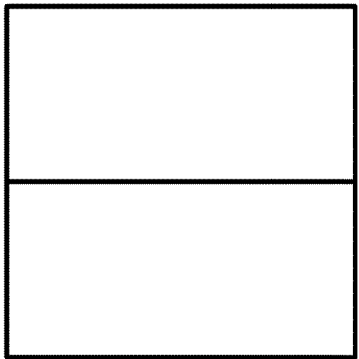
FIG. 6 shows example binary tree and ternary tree partitions.
Figure 6:
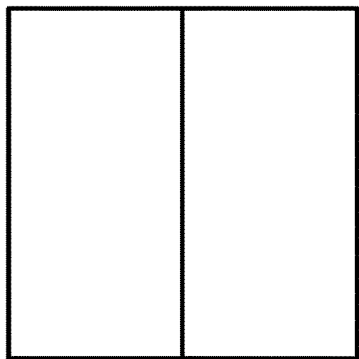
Figure 6:
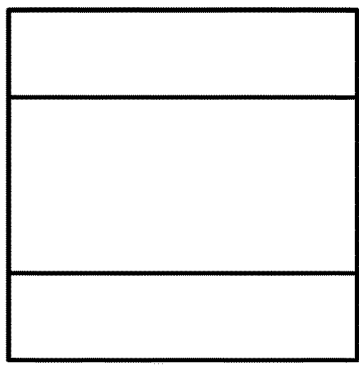
Figure 6:
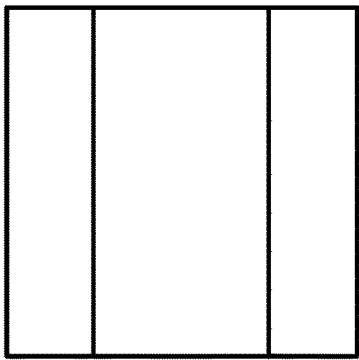

FIG. 6 shows example binary tree and ternary tree partitions. A binary tree partition may divide a parent block in half in either a vertical direction 602 or a horizontal direction 604. The resulting partitions may be half in size as compared to the parent block. The resulting partitions may correspond to sizes that are less than and/or greater than half of the parent block size. A ternary tree partition may divide a parent block into three parts in either a vertical direction 606 or a horizontal direction 608. FIG. 6 shows an example in which the middle partition may be twice as large as the other two end partitions in the ternary tree partitions. In other examples, partitions may be of other sizes relative to each other and to the parent block. Binary and ternary tree partitions are examples of multi-type tree partitioning. Multi-type tree partitions may comprise partitioning a parent block into other quantities of smaller blocks. The block partitioning strategy (e.g., in VVC) may be referred to as a combination of quadtree and multi-type tree partitioning (quadtree+multi-type tree partitioning) because of the addition of binary and/or ternary tree partitioning to quadtree partitioning.

Figure 7:
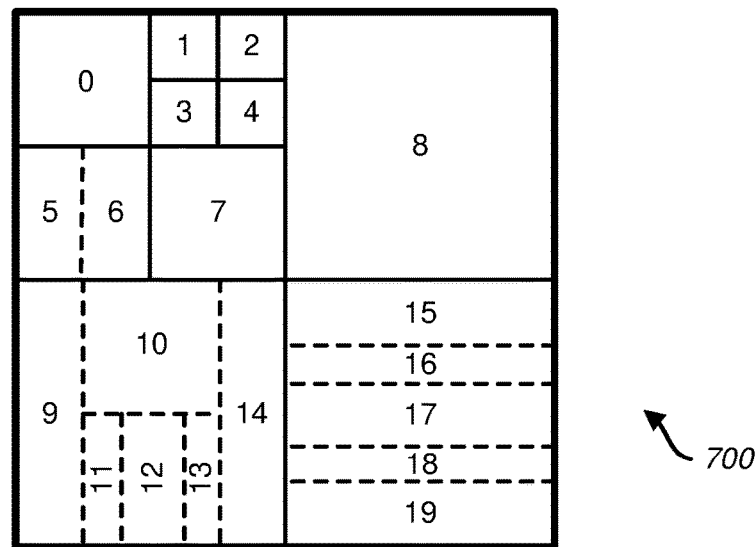
FIG. 7 shows an example of combined quadtree and multi-type tree partitioning of a CTB.
Figure 8:
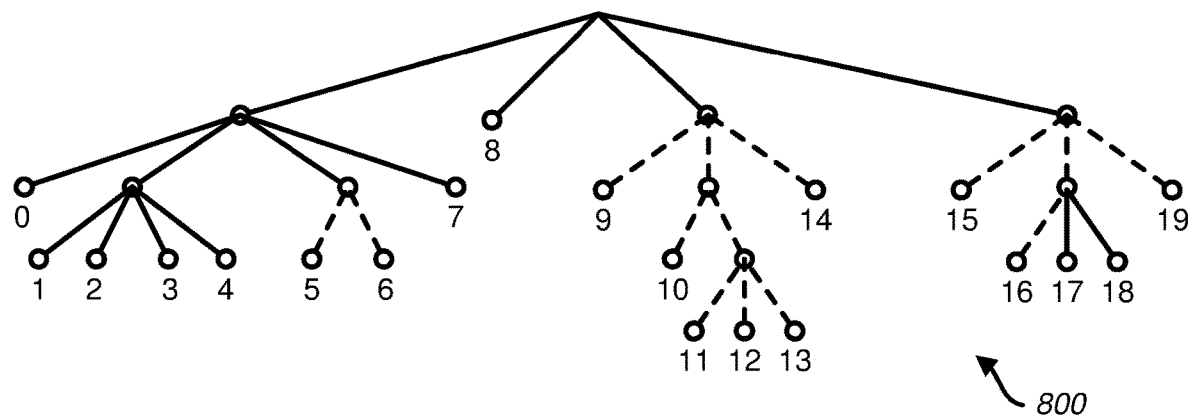
FIG. 8 shows a tree corresponding to the combined quadtree and multi-type tree partitioning of the CTB shown in FIG. 7.

FIG. 7 shows an example of combined quadtree and multi-type tree partitioning of a CTB. FIG. 8 shows a tree corresponding to the combined quadtree and multi-type tree partitioning of the CTB 700 shown in FIG. 7. In both FIGS. 7 and 8, quadtree splits are shown in solid lines and multi-type tree splits are shown in dashed lines. The CTB 700 is shown with the same quadtree partitioning as the CTB 400 described in FIG. 4, and a description of the quadtree partitioning of the CTB 700 is omitted. The quadtree partitioning of the CTB 700 is merely an example and a CTB may be quadtree partitioned in a manner different from the CTB 700. Additional multi-type tree partitions of the CTB 700 may be made relative to three leaf CBs shown in FIG. 4. The three leaf CBs in FIG. 4 that are shown in FIG. 7 as being further partitioned may be leaf CBs 5, 8, and 9. The three leaf CBs may be further partitioned using one or more binary and/or ternary tree partitions.

The leaf CB 5 of FIG. 4 may be partitioned into two CBs based on a vertical binary tree partitioning. The two resulting CBs may be leaf CBs respectively labeled 5 and 6 in FIGS. 7 and 8. The leaf CB 8 of FIG. 4 may be partitioned into three CBs based on a vertical ternary tree partition. Two of the three resulting CBs may be leaf CBs respectively labeled 9 and 14 in FIGS. 7 and 8. The remaining, non-leaf CB may be partitioned first into two CBs based on a horizontal binary tree partition. One of the two CBs may be a leaf CB labeled 10. The other of the two CBs may be further partitioned into three CBs based on a vertical ternary tree partition. The resulting three CBs may be leaf CBs respectively labeled 11, 12, and 13 in FIGS. 7 and 8. The leaf CB 9 of FIG. 4 may be partitioned into three CBs based on a horizontal ternary tree partition. Two of the three CBs may be leaf CBs respectively labeled 15 and 19 in FIGS. 7 and 8. The remaining, non-leaf CB may be partitioned into three CBs based on another horizontal ternary tree partition. The resulting three CBs may all be leaf CBs respectively labeled 16, 17, and 18 in FIGS. 7 and 8.

Altogether, the CTB 700 may be partitioned into 20 leaf CBs respectively labeled 0-19. The 20 leaf CBs may correspond to 20 leaf nodes (e.g., 20 leaf nodes of the tree 800 shown in FIG. 8). The resulting combination of quadtree and multi-type tree partitioning of the CTB 700 may be scanned using a z-scan (left-to-right, top-to-bottom) to form the sequence order for encoding/decoding the CB leaf nodes. A numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and/or TBs.

A coding standard/format (e.g., HEVC, VVC, or any other coding standard/format) may define various units (e.g., in addition to specifying various blocks (e.g., CTBs, CBs, PBs, TBs)). Blocks may comprise a rectangular area of samples in a sample array. Units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

A block may refer to any of a CTB, CB, PB, TB, CTU, CU, PU, and/or TU (e.g., in the context of HEVC, VVC, or any other coding format/standard). A block may be used to refer to similar data structures in the context of any video coding format/standard/protocol. For example, a block may refer to a macroblock in the AVC standard, a macroblock or a sub-block in the VP8 coding format, a superblock or a sub-block in the VP9 coding format, and/or a superblock or a sub-block in the AV1 coding format.

Samples of a block to be encoded (e.g., a current block) may be predicted from samples of the column immediately adjacent to the left-most column of the current block and samples of the row immediately adjacent to the top-most row of the current block, such as in intra prediction. The samples from the immediately adjacent column and row may be jointly referred to as reference samples. Each sample of the current block may be predicted (e.g., in an intra prediction mode) by projecting the position of the sample in the current block in a given direction to a point along the reference samples. The sample may be predicted by interpolating between the two closest reference samples of the projection point if the projection does not fall directly on a reference sample. A prediction error (e.g., a residual) may be determined for the current block based on differences between the predicted sample values and the original sample values of the current block.

Predicting samples and determining a prediction error based on a difference between the predicted samples and original samples may be performed (e.g., at an encoder) for a plurality of different intra prediction modes (e.g., including non-directional intra prediction modes). The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block, using the intra prediction mode indicated by the encoder, and/or combining the predicted samples with the prediction error.

Figure 9:
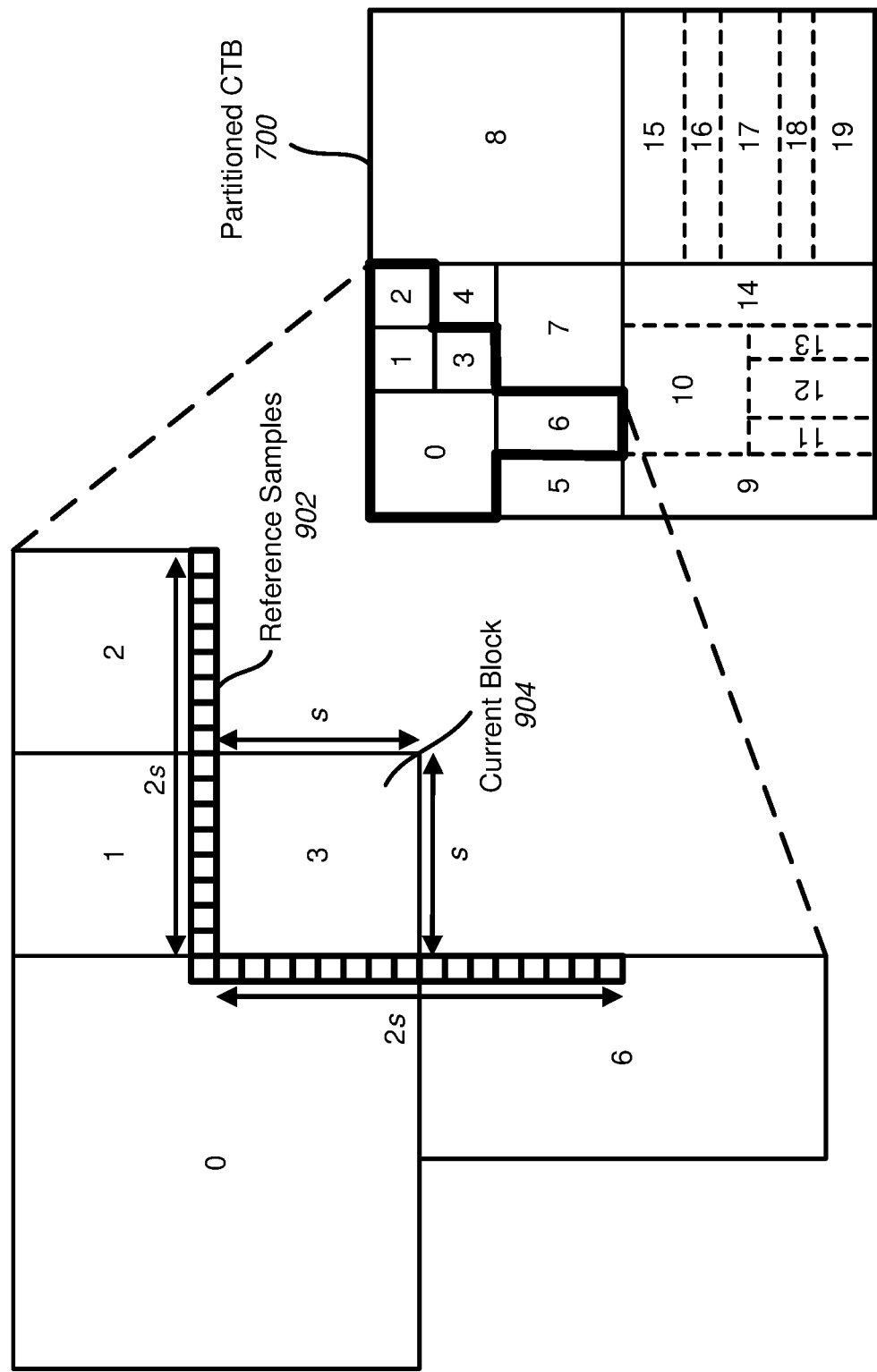
FIG. 9 shows an example set of reference samples determined for intra prediction of a current block.

FIG. 9 shows an example set of reference samples determined for intra prediction of a current block. The current block 904 may correspond to a block being encoded and/or decoded. The current block 904 may correspond to block 3 of the partitioned CTB 700 as shown in FIG. 7. As described herein, the numeric labels 0-19 of the blocks of partitioned CTB 700 may correspond to the sequence order for encoding/decoding the blocks and may be used as such in the example of FIG. 9.

The current block 904 may be w×h samples in size. The reference samples 902 may comprise: 2w samples (or any other quantity of samples) of the row immediately adjacent to the top-most row of the current block 904, 2 h samples (or any other quantity of samples) of the column immediately adjacent to the left-most column of the current block 904, and the top left neighboring corner sample to the current block 904. The current block 904 may be square, such that w=h=s. In other examples, a current block need not be square, such that w≠h. Available samples from neighboring blocks of the current block 904 may be used for constructing the set of reference samples 902. Samples may not be available for constructing the set of reference samples 902, for example, if the samples lie outside the picture of the current block, the samples are part of a different slice of the current block (e.g., if the concept of slices is used), and/or the samples belong to blocks that have been inter coded and constrained intra prediction is indicated. Intra prediction may not be dependent on inter predicted blocks, for example, if constrained intra prediction is indicated.

Samples that may not be available for constructing the set of reference samples 902 may comprise samples in blocks that have not already been encoded and reconstructed at an encoder and/or decoded at a decoder based on the sequence order for encoding/decoding. Restriction of such samples from inclusion in the set of reference samples 902 may allow identical prediction results to be determined at both the encoder and decoder. Samples from neighboring blocks 0, 1, and 2 may be available to construct the reference samples 902 given that these blocks are encoded and reconstructed at an encoder and decoded at a decoder prior to coding of the current block 904. The samples from neighboring blocks 0, 1, and 2 may be available to construct reference samples 902, for example, if there are no other issues (e.g., as mentioned above) preventing the availability of the samples from the neighboring blocks 0, 1, and 2. The portion of reference samples 902 from neighboring block 6 may not be available due to the sequence order for encoding/decoding (e.g., because the block 6 may not have already been encoded and reconstructed at the encoder and/or decoded at the decoder based on the sequence order for encoding/decoding).

Unavailable samples from the reference samples 902 may be filled with one or more of the available reference samples 902. For example, an unavailable reference sample may be filled with a nearest available reference sample. The nearest available reference sample may be determined by moving in a clock-wise direction through the reference samples 902 from the position of the unavailable reference. The reference samples 902 may be filled with the mid-value of the dynamic range of the picture being coded, for example, if no reference samples are available.

The reference samples 902 may be filtered based on the size of current block 904 being coded and an applied intra prediction mode. FIG. 9 shows an exemplary determination of reference samples for intra prediction of a block. Reference samples may be determined in a different manner than described above. For example, multiple reference lines may be used in other instances (e.g., in VVC).

Samples of the current block 904 may be intra predicted based on the reference samples 902, for example, based on (e.g., after) determination and (optionally) filtration of the reference samples. At least some (e.g., most) encoders/decoders may support a plurality of intra prediction modes in accordance with one or more video coding standards. For example, HEVC supports 35 intra prediction modes, including a planar mode, a direct current (DC) mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture. Any quantity of intra prediction modes may be supported.

Figure 10A:
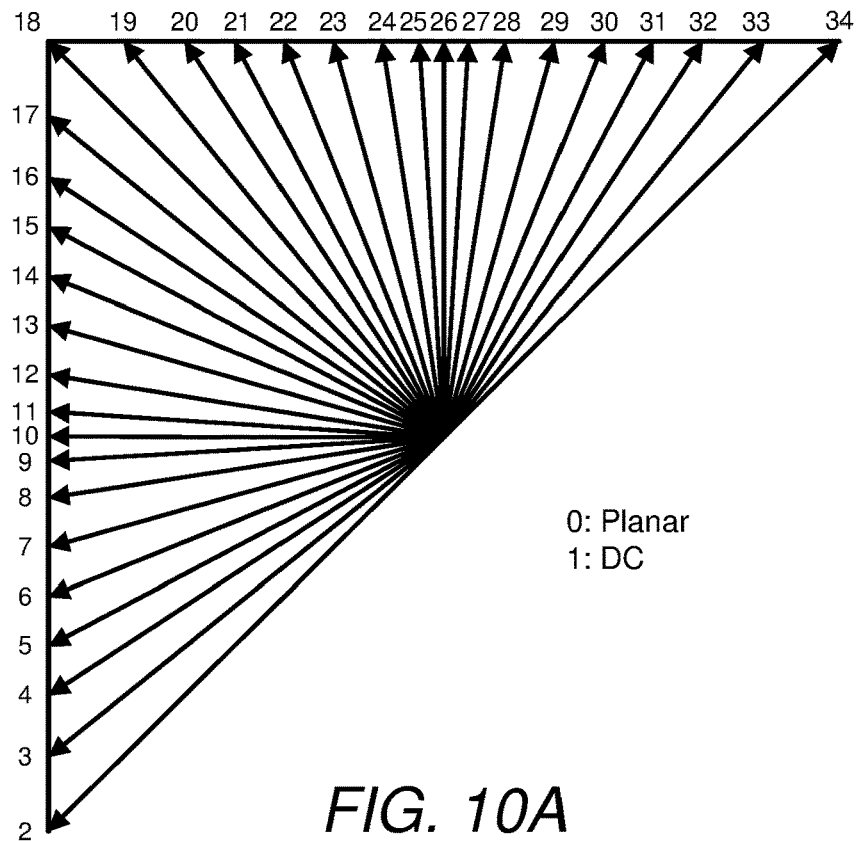
FIGS. 10A and 10B show example intra prediction modes.
Figure 10B:
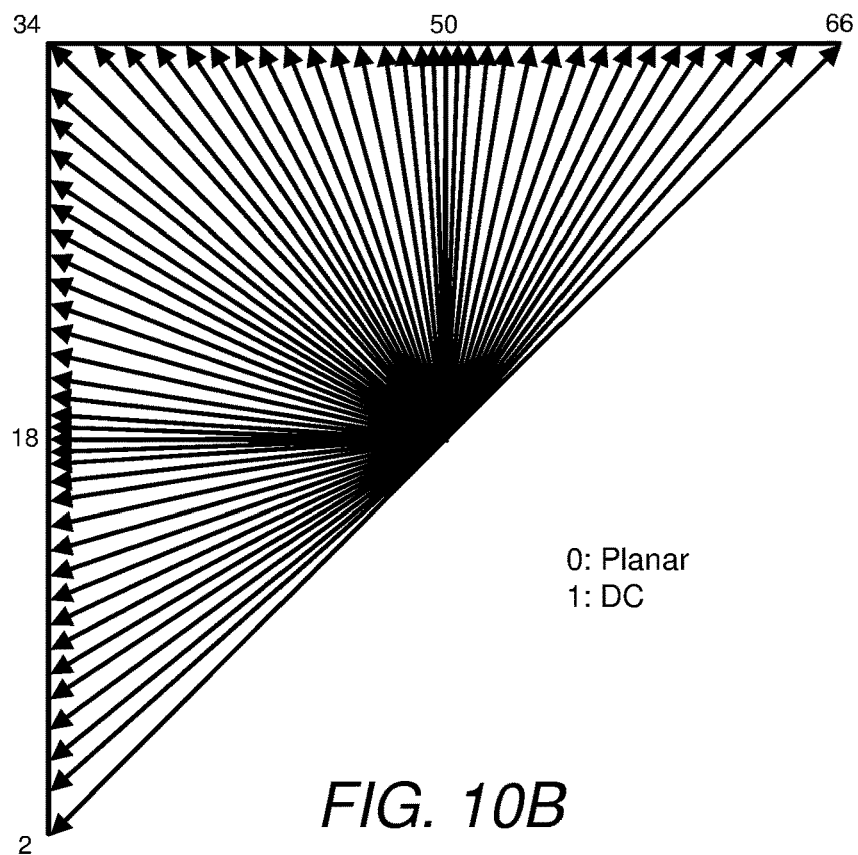

FIGS. 10A and 10B show example intra prediction modes. FIG. 10A shows 35 intra prediction modes, such as supported by HEVC. The 35 intra prediction modes may be indicated/identified by indices 0 to 34. Prediction mode 0 may correspond to planar mode. Prediction mode 1 may correspond to DC mode. Prediction modes 2-34 may correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

FIG. 10B shows 67 intra prediction modes, such as supported by VVC. The 67 intra prediction modes may be indicated/identified by indices 0 to 66. Prediction mode 0 may correspond to planar mode. Prediction mode 1 corresponds to DC mode. Prediction modes 2-66 may correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Some of the intra prediction modes illustrated in FIG. 10B may be adaptively replaced by wide-angle directions because blocks in VVC need not be squares.

Figure 11:
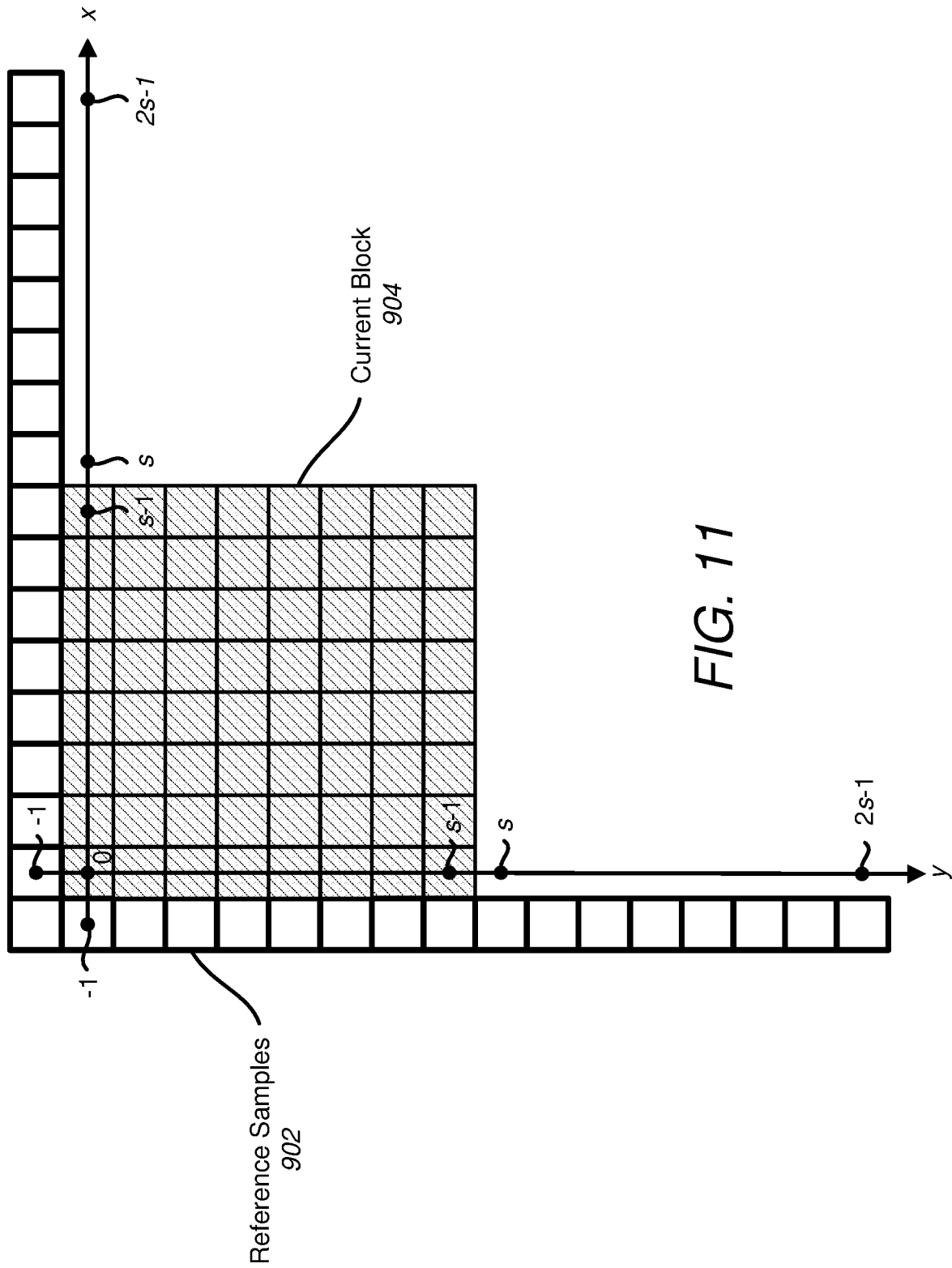
FIG. 11 shows a current block and corresponding reference samples.

FIG. 11 shows a current block and corresponding reference samples. In FIG. 11, the current block 904 and the reference samples 902 from FIG. 9 are shown in a two-dimensional x, y plane, where a sample may be referenced as p[x][y]. In order to simplify the prediction process, the reference samples 902 may be placed in two, one-dimensional arrays. The reference samples 902, above the current block 904, may be placed in the one-dimensional array $ref_1[x]$:

$$ref_1[x] = p[-1+x][-1], (x \geq 0). \quad (1)$$

The reference samples 902 to the left of the current block 904 may be placed in the one-dimensional array $ref_2[y]$:

$$ref_2[y] = p[-1][-1+y], (y \geq 0). \quad (2)$$

The prediction process may comprise determination of a predicted sample p[x][y] (e.g., a predicted value) at a location [x][y] in the current block 904. For planar mode, a sample at the location [x][y] in the current block 904 may be predicted by determining/calculating the mean of two interpolated values. The first of the two interpolated values may be based on a horizontal linear interpolation at the location [x][y] in the current block 904. The second of the two interpolated values may be based on a vertical linear interpolation at the location [x][y] in the current block 904. The predicted sample p[x][y] in the current block 904 may be determined/calculated as:

$$p[x][y] = \frac{1}{2 \cdot s}(h[x][y] + v[x][y] + s), \quad (3)$$

where $$h[x][y] = (s - x - 1) \cdot ref_2[y] + (x + 1) \cdot ref_1[s] \quad (4)$$

may be the horizontal linear interpolation at the location [x][y] in the current block 904 and $$v[x][y] = (s - y - 1) \cdot ref_1[x] + (y + 1) \cdot ref_2[s] \quad (5)$$

may be the vertical linear interpolation at the location [x][y] in the current block 904. s may be equal to a length of a side (e.g., a number of samples on a side) of the current block 904.

A sample at a location [x][y] in the current block 904 may be predicted by the mean of the reference samples 902, such as for a DC mode. The predicted sample p[x][y] in the current block 904 may be determined/calculated as:

$$p[x][y] = \frac{1}{2 \cdot s}\left(\sum_{x=0}^{s-1} ref_1[x] + \sum_{y=0}^{s-1} ref_2[y]\right). \quad (6)$$

A sample at a location [x][y] in the current block 904 may be predicted by projecting the location [x][y] in a direction specified by a given angular mode to a point on the horizontal or vertical line of samples comprising the reference samples 902, such as for an angular mode. The sample at the location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC). The direction specified by the angular mode may be given by an angle φ defined relative to the x-axis for horizontal prediction modes (e.g., modes 2-18 in HEVC and modes 2-34 in VVC).

Figure 12:
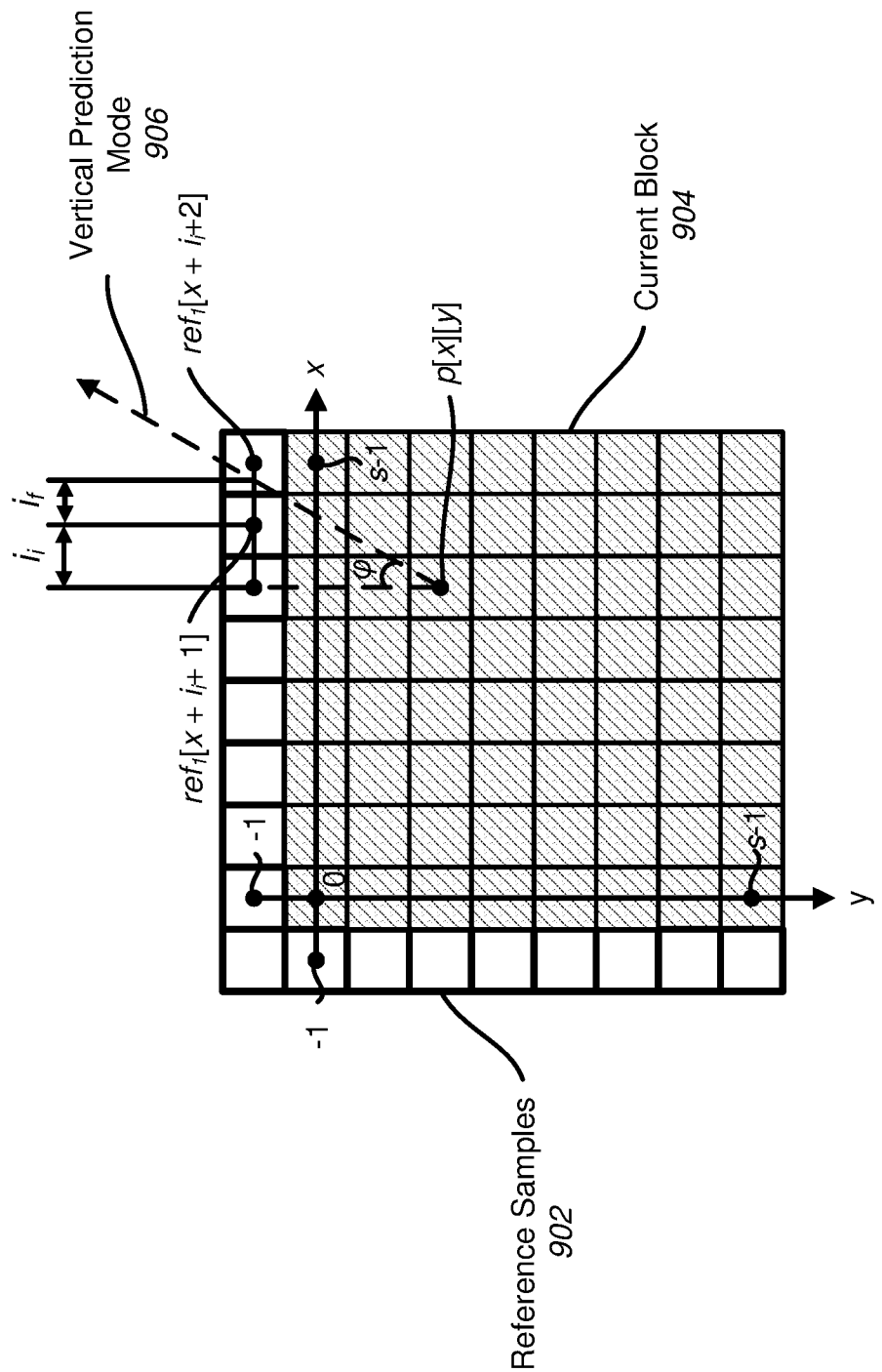
FIG. 12 shows an example application of an intra prediction mode for prediction of a current block.

FIG. 12 shows an example application of an intra prediction mode for prediction of a current block. FIG. 12 specifically shows prediction of a sample at a location [x][y] in the current block 904 for a vertical prediction mode 906. The vertical prediction mode 906 may be given by an angle φ with respect to the vertical axis. The location [x][y] in the current block 904, in vertical prediction modes, may be projected to a point (e.g., a projection point) on the horizontal line of reference samples $ref_1[x]$. The reference samples 902 are only partially shown in FIG. 12 for ease of illustration. As shown in FIG. 12, the projection point on the horizontal line of reference samples $ref_1[x]$ may not be exactly on a reference sample. A predicted sample p[x][y] in the current block 904 may be determined/calculated by linearly interpolating between the two reference samples, for example, if the projection point falls at a fractional sample position between two reference samples. The predicted sample p[x][y] may be determined/calculated as:

$$p[x][y] = (1 - i_f) \cdot ref_1[x + i_i + 1] + i_f \cdot ref_1[x + i_i + 2]. \quad (7)$$

$i_i$ may be the integer part of the horizontal displacement of the projection point relative to the location [x][y]. $i_i$ may be determined/calculated as a function of the tangent of the angle φ of the vertical prediction mode 906 as:

$$i_i = \lfloor (y+1) \cdot \tan \varphi \rfloor. \quad (8)$$

if may be the fractional part of the horizontal displacement of the projection point relative to the location [x][y] and may be determined/calculated as:

$$i_f = ((y+1) \cdot \tan \varphi) - \lfloor (y+1) \cdot \tan \varphi \rfloor, \quad (9)$$

where $\lfloor \cdot \rfloor$ is the integer floor function.

A location [x][y] of a sample in the current block 904 may be projected onto the vertical line of reference samples $ref_2[y]$, such as for horizontal prediction modes. A predicted sample p[x][y for horizontal prediction modes may be determined/calculated as:

$$p[x][y] = (1 - i_f) \cdot ref_2[y + i_i + 1] + i_f \cdot ref_2[y + i_i + 2]. \quad (10)$$

$i_i$ may be the integer part of the vertical displacement of the projection point relative to the location [x][y]. $i_i$ may be determined/calculated as a function of the tangent of the angle φ of the horizontal prediction mode as:

$$i_i = \lfloor (x+1) \cdot \tan \varphi \rfloor. \quad (11)$$

$i_i$ may be the fractional part of the vertical displacement of the projection point relative to the location [x][y]. $i_i$ may be determined/calculated as:

$$i_f = ((x+1) \cdot \tan \varphi) - \lfloor (x+1) \cdot \tan \varphi \rfloor, \quad (12)$$

where $\lfloor \cdot \rfloor$ is the integer floor function.

The interpolation functions given by Equations (7) and (10) may be implemented by an encoder and/or a decoder (e.g., the encoder 200 in FIG. 2 and/or the decoder 300 in FIG. 3). The interpolation functions may be implemented by finite impulse response (FIR) filters. For example, the interpolation functions may be implemented as a set of two-tap FIR filters. The coefficients of the two-tap FIR filters may be respectively given by $(1-i_f)$ and $i_f$. The predicted sample p[x][y], in angular intra prediction, may be calculated with some predefined level of sample accuracy (e.g., 1/32 sample accuracy, or accuracy defined by any other metric). For 1/32 sample accuracy, the set of two-tap FIR interpolation filters may comprise up to 32 different two-tap FIR interpolation filters—one for each of the 32 possible values of the fractional part of the projected displacement $i_f$. In other examples, different levels of sample accuracy may be used.

The FIR filters may be used for predicting chroma samples and/or luma samples. For example, the two-tap interpolation FIR filter may be used for predicting chroma samples and a same and/or a different interpolation technique/filter may be used for luma samples. For example, a four-tap FIR filter may be used to determine a predicted value of a luma sample. Coefficients of the four tap FIR filter may be determined based on $i_f$ (e.g., similar to the two-tap FIR filter). For 1/32 sample accuracy, a set of 32 different four-tap FIR filters may comprise up to 32 different four-tap FIR filters—one for each of the 32 possible values of the fractional part of the projected displacement $i_f$. In other examples, different levels of sample accuracy may be used. The set of four-tap FIR filters may be stored in a look-up table (LUT) and referenced based on $i_f$. A predicted sample p[x][y], for vertical prediction modes, may be determined based on the four-tap FIR filter as:

$$p[x][y] = \sum_{i=0}^{3} fT[i] \cdot ref_1[x + iIdx + i], \quad (13)$$

where fT[i], i=0 . . . 3, may be the filter coefficients, and Idx is integer displacement. A predicted sample p[x][y], for horizontal prediction modes, may be determined based on the four-tap FIR filter as:

$$p[x][y] = \sum_{i=0}^{3} fT[i] \cdot ref_2[y + iIdx + i]. \quad (14)$$

Supplementary reference samples may be determined/constructed if the location [x][y] of a sample in the current block 904 to be predicted is projected to a negative x coordinate. The location [x][y] of a sample may be projected to a negative x coordinate, for example, if negative vertical prediction angles φ are used. The supplementary reference samples may be determined/constructed by projecting the reference samples in [ref]_2 [y] in the vertical line of reference samples 902 to the horizontal line of reference samples 902 using the negative vertical prediction angle φ. Supplementary reference samples may be similarly determined/constructed, for example, if the location [x][y] of a sample in the current block 904 to be predicted is projected to a negative y coordinate. The location [x][y] of a sample may be projected to a negative y coordinate, for example, if negative horizontal prediction angles φ are used. The supplementary reference samples may be determined/constructed by projecting the reference samples in [ref]_1 [x] on the horizontal line of reference samples 902 to the vertical line of reference samples 902 using the negative horizontal prediction angle φ.

An encoder may determine/predict samples of a current block being encoded (e.g., the current block 904) for a plurality of intra prediction modes (e.g., using one or more of the functions described herein). For example, an encoder may determine/predict samples of a current block for each of 35 intra prediction modes in HEVC and/or 67 intra prediction modes in VVC. The encoder may determine, for each intra prediction mode applied, a corresponding prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may determine/select one of the intra prediction modes to encode the current block based on the determined prediction errors. For example, the encoder may determine/select one of the intra prediction modes that results in the smallest prediction error for the current block. The encoder may determine/select the intra prediction mode to encode the current block based on a rate-distortion measure (e.g., Lagrangian rate-distortion cost) determined using the prediction errors. The encoder may send an indication of the determined/selected intra prediction mode and its corresponding prediction error (e.g., residual) to a decoder for decoding of the current block.

A decoder may determine/predict samples of a current block being decoded (e.g., the current block 904) for an intra prediction mode. For example, a decoder may receive an indication of an intra prediction mode (e.g., an angular intra prediction mode) from an encoder for a current block. The decoder may construct a set of reference samples and perform intra prediction based on the intra prediction mode indicated by the encoder for the current block in a similar manner (e.g., as described above for the encoder). The decoder may add predicted values of the samples (e.g., determined based on the intra prediction mode) of the current block to a residual of the current block to reconstruct the current block. A decoder need not receive an indication of an angular intra prediction mode from an encoder for a current block. A decoder may determine an intra prediction mode, for example, based on other criteria. While various examples herein correspond to intra prediction modes in HEVC and VVC, the methods, devices, and systems as described herein may be applied to/used for other intra prediction modes (e.g., as used in other video coding standards/formats, such as VP8, VP9, AV1, etc.).

Intra prediction may exploit correlations between spatially neighboring samples in the same picture of a video sequence to perform video compression. Inter prediction is another coding tool that may be used to perform video compression. Inter prediction may exploit correlations in the time domain between blocks of samples in different pictures of a video sequence. For example, an object may be seen across multiple pictures of a video sequence. The object may move (e.g., by some translation and/or affine motion) or remain stationary across the multiple pictures. A current block of samples in a current picture being encoded may have/be associated with a corresponding block of samples in a previously decoded picture. The corresponding block of samples may accurately predict the current block of samples. The corresponding block of samples may be displaced from the current block of samples, for example, due to movement of the object, represented in both blocks, across the respective pictures of the blocks. The previously decoded picture may be a reference picture. The corresponding block of samples in the reference picture may be a reference block for motion compensated prediction. An encoder may use a block matching technique to estimate the displacement (or motion) of the object and/or to determine the reference block in the reference picture.

An encoder may determine a difference between a current block and a prediction for a current block. An encoder may determine a difference, for example, based on/after determining/generating a prediction for a current block (e.g., using inter prediction). The difference may be a prediction error and/or as a residual. The encoder may store and/or send (e.g., signal), in/via a bitstream, the prediction error and/or other related prediction information. The prediction error and/or other related prediction information may be used for decoding and/or other forms of consumption. A decoder may decode the current block by predicting the samples of the current block (e.g., by using the related prediction information) and combining the predicted samples with the prediction error.

Figure 13A:
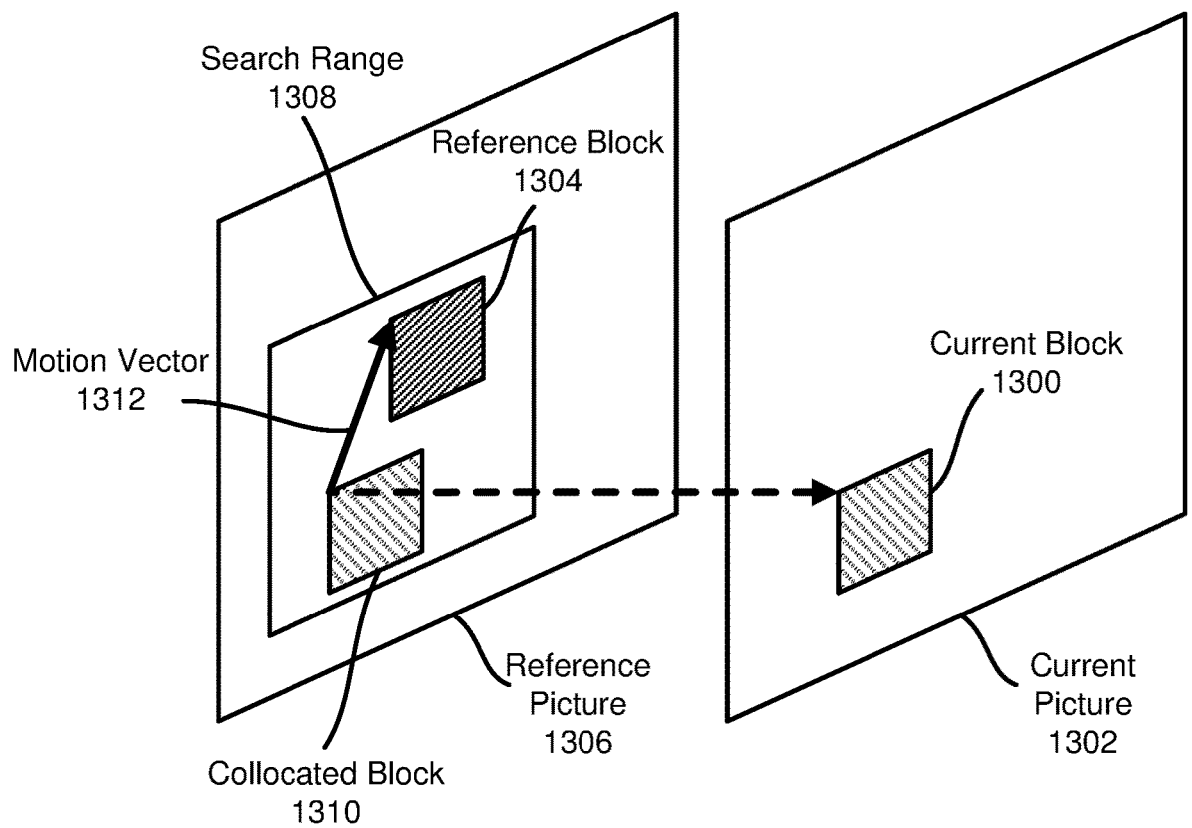
FIG. 13A shows an example of inter prediction.

FIG. 13A shows an example of inter prediction. The inter prediction may be performed for a current block 1300 in a current picture 1302 being encoded. An encoder (e.g., the encoder 200 as shown in FIG. 2) may perform inter prediction to determine and/or generate a reference block 1304 in a reference picture 1306. The reference block 1304 may be used to predict the current block 1300. Reference pictures (e.g., the reference picture 1306) may be prior decoded pictures available at the encoder and/or a decoder. Availability of a prior decoded picture may depend/be based on whether the prior decoded picture is available in a decoded picture buffer, at the time, the current block 1300 is being encoded and/or decoded. The encoder may search the one or more reference pictures 1306 for a block that is similar (or substantially similar) to the current block 1300. The encoder may determine the best matching block from the blocks tested during the searching process. The best matching block may be a reference block 1304. The encoder may determine that the reference block 1304 is the best matching reference block based on one or more cost criteria. The one or more cost criteria may comprise a rate-distortion criterion (e.g., Lagrangian rate-distortion cost). The one or more cost criteria may be based on a difference (e.g., SSD, SAD, and/or SATD) between prediction samples of the reference block 1304 and original samples of the current block 1300.

The encoder may search for the reference block 1304 within a reference region (e.g., a search range 1308). The reference region (e.g., a search range 1308) may be positioned around a collocated position (or block) 1310, of the current block 1300, in the reference picture 1306. The collocated block 1310 may have a same position in the reference picture 1306 as the current block 1300 in the current picture 1302. The reference region (e.g., a search range 1308) may at least partially extend outside of the reference picture 1306. Constant boundary extension may be used, for example, if the reference region (e.g., a search range 1308) extends outside of the reference picture 1306. The constant boundary extension may be used such that values of the samples in a row or a column of reference picture 1306, immediately adjacent to a portion of the reference region (e.g., a search range 1308) extending outside of the reference picture 1306, may be used for sample locations outside of the reference picture 1306. A subset of potential positions, or all potential positions, within the reference region (e.g., a search range 1308) may be searched for the reference block 1304. The encoder may utilize one or more search implementations to determine and/or generate the reference block 1304. For example, the encoder may determine a set of candidate search positions based on motion information of neighboring blocks (e.g., a motion vector 1312) to the current block 1300.

One or more reference pictures may be searched by the encoder during inter prediction to determine and/or generate the best matching reference block. The reference pictures searched by the encoder may be included in (e.g., added to) one or more reference picture lists. For example, in HEVC and VVC (and/or in one or more other communication protocols), two reference picture lists may be used (e.g., a reference picture list 0 and a reference picture list 1). A reference picture list may include one or more pictures. The reference picture 1306 of the reference block 1304 may be indicated by a reference index pointing into a reference picture list comprising the reference picture 1306.

Figure 13B:
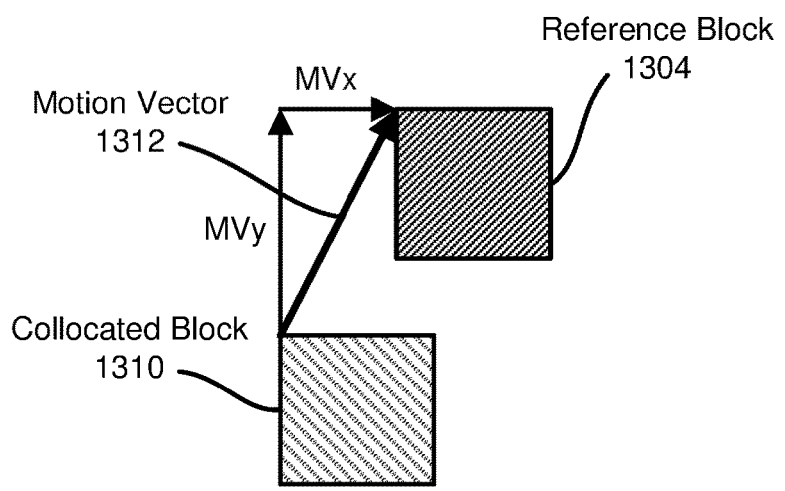
FIG. 13B shows an example motion vector.

FIG. 13B shows an example motion vector. A displacement between the reference block 1304 and the current block 1300 may be interpreted as an estimate of the motion between the reference block 1304 and the current block 1300 across their respective pictures. The displacement may be represented by a motion vector 1312. For example, the motion vector 1312 may be indicated by a horizontal component (MVx) and a vertical component (MVy) relative to the position of the current block 1300. A motion vector (e.g., the motion vector 1312) may have fractional or integer resolution. A motion vector with fractional resolution may point between two samples in a reference picture to provide a better estimation of the motion of the current block 1300. For example, a motion vector may have ½, ¼, ⅛, ¹⁄₁₆, ¹⁄₃₂, or any other fractional sample resolution. Interpolation between the two samples at integer positions may be used to generate a reference block and its corresponding samples at fractional positions, for example, if a motion vector points to a non-integer sample value in the reference picture. The interpolation may be performed by a filter with two or more taps.

The encoder may determine a difference (e.g., a corresponding sample-by-sample difference) between the reference block 1304 and the current block 1300. The encoder may determine the difference between the reference block 1304 and the current block 1300, for example, based on/after the reference block 1304 is determined and/or generated, using inter prediction, for the current block 1300. The difference may be a prediction error and/or a residual. The encoder may store and/or send (e.g., signal), in/via a bitstream, the prediction error and/or related motion information. The prediction error and/or the related motion information may be used for decoding (e.g., decoding the current block 1300) and/or other forms of consumption. The motion information may comprise the motion vector 1312 and/or a reference indicator/index. The reference indicator may indicate the reference picture 1306 in a reference picture list. The motion information may comprise an indication of the motion vector 1312 and/or an indication of the reference index. The reference index may indicate reference picture 1306 in the reference picture list. A decoder may decode the current block 1300 by determining and/or generating the reference block 1304. The decoder may determine and/or generate the reference block 1304, for example, based on the prediction error and/or the related motion information. The reference block 1304 may correspond to/form (e.g., be considered as) a prediction of the current block 1300. The decoder may decode the current block 1300 based on combining the prediction with the prediction error.

Inter prediction, as shown in FIG. 13A, may be performed using one reference picture 1306 as a source of a prediction for the current block 1300. Inter prediction based on a prediction of a current block using a single picture may be referred to as uni-prediction.

Inter prediction of a current block, using bi-prediction, may be based on two pictures. Bi-prediction may be useful, for example, if a video sequence comprises fast motion, camera panning, zooming, and/or scene changes. Bi-prediction may be useful to capture fade outs of one scene or fade outs from one scene to another, where two pictures may effectively be displayed simultaneously with different levels of intensity.

One or both of uni-prediction and bi-prediction may be available/used for performing inter prediction (e.g., at an encoder and/or at a decoder). Performing a specific type of inter prediction (e.g., uni-prediction and/or bi-prediction) may depend on a slice type of current block. For example, for P slices, only uni-prediction may be available/used for performing inter prediction. For B slices, either uni-prediction or bi-prediction may be available/used for performing inter prediction. An encoder may determine and/or generate a reference block, for predicting a current block, from a reference picture list 0, for example, if the encoder is using uni-prediction. An encoder may determine and/or generate a first reference block, for predicting a current block, from a reference picture list 0 and determine and/or generate a second reference block, for predicting the current block, from a reference picture list 1, for example, if the encoder is using bi-prediction.

Figure 14:
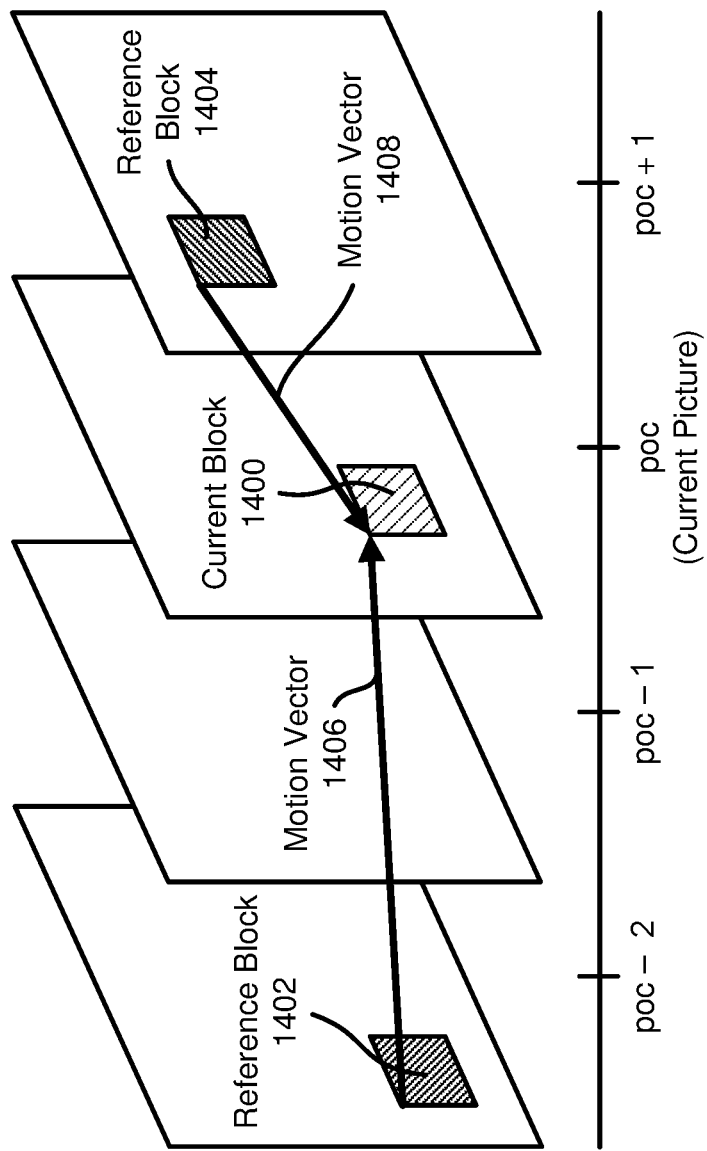
FIG. 14 shows an example of bi-prediction.

FIG. 14 shows an example of bi-prediction. Two reference blocks 1402 and 1404 may be used to predict a current block 1400. The reference block 1402 may be in a reference picture of one of reference picture list 0 or reference picture list 1. The reference block 1404 may be in a reference picture of another one of reference picture list 0 or reference picture list 1. As shown in FIG. 14, the reference block 1402 may be in a first picture that precedes (e.g., in time) a current picture of the current block 1400, and the reference block 1404 may be in a second picture that succeeds (e.g., in time) the current picture of the current block 1400. The first picture may precede the current picture in terms of a picture order count (POC). The second picture may succeed the current picture in terms of the POC. The reference pictures may both precede or both succeed the current picture in terms of POC. A POC may be/indicate an order in which pictures are output (e.g., from a decoded picture buffer). A POC may be/indicate an order in which pictures are generally intended to be displayed. Pictures that are output may not necessarily be displayed but may undergo different processing and/or consumption (e.g., transcoding). The two reference blocks determined and/or generated using/for bi-prediction may correspond to (e.g., be comprised in) a same reference picture. The reference picture may be included in both the reference picture list 0 and the reference picture list 1, for example, if the two reference blocks correspond to the same reference picture.

A configurable weight and/or offset value may be applied to one or more inter prediction reference blocks. An encoder may enable the use of weighted prediction using a flag in a picture parameter set (PPS). The encoder may send/signal the weight and/or offset parameters in a slice segment header for the current block 1400. Different weight and/or offset parameters may be sent/signaled for luma and/or chroma components.

The encoder may determine and/or generate the reference blocks 1402 and 1404 for the current block 1400 using inter prediction. The encoder may determine a difference between the current block 1400 and each of the reference blocks 1402 and 1404. The differences may be prediction errors or residuals. The encoder may store and/or send/signal, in/via a bitstream, the prediction errors and/or their respective related motion information. The prediction errors and their respective related motion information may be used for decoding and/or other forms of consumption. The motion information for the reference block 1402 may comprise a motion vector 1406 and/or a reference indicator/index. The reference indicator may indicate a reference picture, of the reference block 1402, in a reference picture list. The motion information for the reference block 1402 may comprise an indication of the motion vector 1406 and/or an indication of the reference index. The reference index may indicate the reference picture, of the reference block 1402, in the reference picture list.

The motion information for the reference block 1404 may comprise a motion vector 1408 and/or a reference index/indicator. The reference indicator may indicate a reference picture, of the reference block 1408, in a reference picture list. The motion information for the reference block 1404 may comprise an indication of motion vector 1408 and/or an indication of the reference index. The reference index may indicate the reference picture, of the reference block 1404, in the reference picture list.

A decoder may decode the current block 1400 by determining and/or generating the reference blocks 1402 and 1404. The decoder may determine and/or generate the reference blocks 1402 and 1404, for example, based on the prediction errors and/or the respective related motion information for the reference blocks 1402 and 1404. The reference blocks 1402 and 1404 may correspond to/form (e.g., be considered as) the predictions of the current block 1400. The decoder may decode the current block 1400 based on combining the predictions with the prediction errors.

Motion information may be predictively coded, for example, before being stored and/or sent/signaled in/via a bit stream (e.g., in HEVC, VVC, and/or other video coding standards/formats/protocols). The motion information for a current block may be predictively coded based on motion information of one or more blocks neighboring the current block. The motion information of the neighboring block(s) may often correlate with the motion information of the current block because the motion of an object represented in the current block is often the same as (or similar to) the motion of objects in the neighboring block(s). Motion information prediction techniques may comprise advanced motion vector prediction (AMVP) and/or inter prediction block merging.

An encoder (e.g., the encoder 200 as shown in FIG. 2), may code a motion vector. The encoder may code the motion vector (e.g., using AMVP) as a difference between a motion vector of a current block being coded and a motion vector predictor (MVP). An encoder may determine/select the MVP from a list of candidate MVPs. The candidate MVPs may be/correspond to previously decoded motion vectors of neighboring blocks in the current picture of the current block, and/or blocks at or near the collocated position of the current block in other reference pictures. The encoder and/or a decoder may generate and/or determine the list of candidate MVPs.

The encoder may determine/select an MVP from the list of candidate MVPs. The encoder may send/signal, in/via a bitstream, an indication of the selected MVP and/or a motion vector difference (MVD). The encoder may indicate the selected MVP in the bitstream using an index/indicator. The index may indicate the selected MVP in the list of candidate MVPs. The MVD may be determined/calculated based on a difference between the motion vector of the current block and the selected MVP. For example, for a motion vector that indicates a position (e.g., represented by a horizontal component (MVx) and a vertical component (MVy)) relative to a position of the current block being coded, the MVD may be represented by two components MVD_x and MVD_y. MVD_x and MVD_y may be determined/calculated as:

$$MVD_x = MV_x - MVP_x, \quad (15)$$

$$MVD_y = MV_y - MVP_y. \quad (16)$$

MVDx and MVDy may respectively represent horizontal and vertical components of the MVD. MVPx and MVPy may respectively represent horizontal and vertical components of the MVP. A decoder (e.g., the decoder 300 as shown in FIG. 3) may decode the motion vector by adding the MVD to the MVP indicated in/via the bitstream.

The decoder may decode the current block by determining and/or generating the reference block. The decoder may determine and/or generate the reference block, for example, based on the decoded motion vector. The reference block may correspond to/form (e.g., be considered as) the prediction of the current block. The decoder may decode the current block by combining the prediction with the prediction error.

The list of candidate MVPs (e.g., in HEVC, VVC, and/or one or more other communication protocols), for AMVP, may comprise two or more candidates (e.g., candidates A and B). Candidates A and B may comprise: up to two (or any other quantity of) spatial candidate MVPs determined/derived from five (or any other quantity of) spatial neighboring blocks of a current block being coded; one (or any other quantity of) temporal candidate MVP determined/derived from two (or any other quantity of) temporal, co-located blocks (e.g., if both of the two spatial candidate MVPs are not available or are identical); and/or zero motion vector candidate MVPs (e.g., if one or both of the spatial candidate MVPs or temporal candidate MVPs are not available). Other quantities of spatial candidate MVPs, spatial neighboring blocks, temporal candidate MVPs, and/or temporal, co-located blocks may be used for the list of candidate MVPs.

Figure 15A:
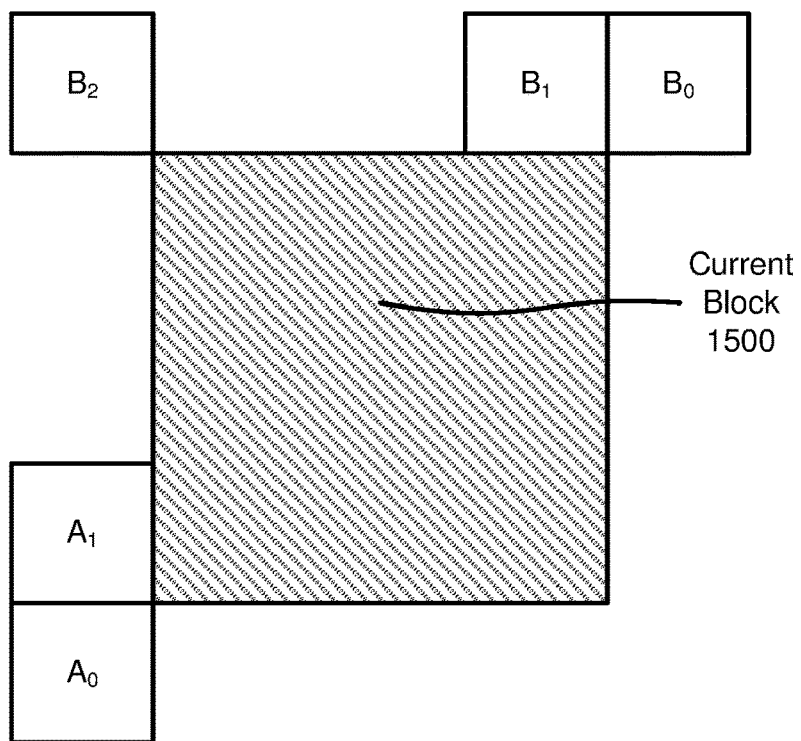
FIG. 15A shows example spatial candidate neighboring blocks for a current block.
Figure 15B:
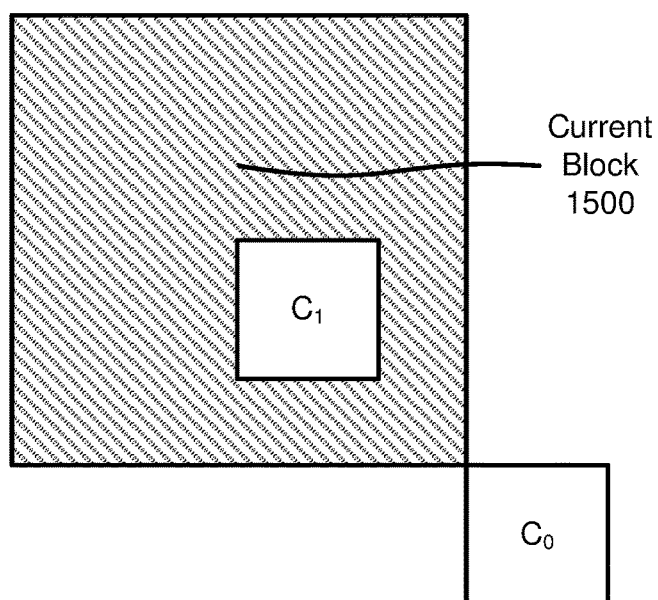
FIG. 15B shows example temporal, co-located blocks for a current block.

FIG. 15A shows spatial candidate neighboring blocks for a current block. For example, five (or any other quantity of) spatial candidate neighboring blocks may be located relative to a current block 1500 being encoded. The five spatial candidate neighboring blocks may be A0, A1, B0, B1, and B2. FIG. 15B shows temporal, co-located blocks for the current block. For example, two (or any other quantity of) temporal, co-located blocks may be located relative to the current block 1500. The two temporal, co-located blocks may be C0 and C1. The two temporal, co-located blocks may be in one or more reference pictures that may be different from the current picture of the current block 1500.

An encoder (e.g., the encoder 200 as shown in FIG. 2) may code a motion vector using inter prediction block merging (e.g., a merge mode). The encoder (e.g., using merge mode) may reuse the same motion information of a neighboring block (e.g., one of neighboring blocks A0, A1, B0, B1, and B2) for inter prediction of a current block. The encoder (e.g., using merge mode) may reuse the same motion information of a temporal, co-located block (e.g., one of temporal, co-located blocks C0 and C1) for inter prediction of a current block. An MVD need not be sent (e.g., indicated, signaled) for the current block because the same motion information as that of a neighboring block or a temporal, co-located block may be used for the current block (e.g., at the encoder and/or a decoder). A signaling overhead for sending/signaling the motion information of the current block may be reduced because the MVD need not be indicated for the current block. The encoder and/or the decoder may generate a candidate list of motion information from neighboring blocks or temporal, co-located blocks of the current block (e.g., in a manner similar to AMVP). The encoder may determine to use (e.g., inherit) motion information, of one neighboring block or one temporal, co-located block in the candidate list, for predicting motion information of the current block being coded. The encoder may signal/send, in/via a bit stream, an indication of the determined motion information from the candidate list. For example, the encoder may signal/send an indicator/index. The index may indicate the determined motion information in the list of candidate motion information. The encoder may signal/send the index to indicate the determined motion information.

A list of candidate motion information for merge mode (e.g., in HEVC, VVC, or any other coding formats/standards/protocols) may comprise: up to four (or any other quantity of) spatial merge candidates derived/determined from five (or any other quantity of) spatial neighboring blocks (e.g., as shown in FIG. 15A); one (or any other quantity of) temporal merge candidate derived from two (or any other quantity of) temporal, co-located blocks (e.g., as shown in FIG. 15B); and/or additional merge candidates comprising bi-predictive candidates and zero motion vector candidates. The spatial neighboring blocks and the temporal, co-located blocks used for merge mode may be the same as the spatial neighboring blocks and the temporal, co-located blocks used for AMVP.

Inter prediction may be performed in other ways and variants than those described herein. For example, motion information prediction techniques other than AMVP and merge mode may be used. While various examples herein correspond to inter prediction modes, such as used in HEVC and VVC, the methods, devices, and systems as described herein may be applied to/used for other inter prediction modes (e.g., as used for other video coding standards/formats such as VP8, VP9, AV1, etc.). History based motion vector prediction (HMVP), combined intra/inter prediction mode (CIIP), and/or merge mode with motion vector difference (MMVD) (e.g., as described in VVC) may be performed/used and are within the scope of the present disclosure.

Block matching may be used (e.g., in inter prediction) to determine a reference block in a different picture than that of a current block being encoded. Block matching may be used to determine a reference block in a same picture as that of a current block being encoded. The reference block, in a same picture as that of the current block, as determined using block matching may often not accurately predict the current block (e.g., for camera captured videos). Prediction accuracy for screen content videos may not be similarly impacted, for example, if a reference block in the same picture as that of the current block is used for encoding. Screen content videos may comprise, for example, computer generated text, graphics, animation, etc. Screen content videos may comprise (e.g., may often comprise) repeated patterns (e.g., repeated patterns of text and/or graphics) within the same picture. Using a reference block (e.g., as determined using block matching), in a same picture as that of a current block being encoded, may provide efficient compression for screen content videos.

A prediction technique may be used (e.g., in HEVC, VVC, and/or any other coding standards/formats/protocols) to exploit correlation between blocks of samples within a same picture (e.g., of screen content videos). The prediction technique may be intra block copy (IBC) or current picture referencing (CPR). An encoder may apply/use a block matching technique (e.g., similar to inter prediction) to determine a displacement vector (e.g., a block vector (BV)). The BV may indicate a relative position of a reference block (e.g., in accordance with intra block compensated prediction), that best matches the current block, from a position of the current block. For example, the relative position of the reference block may be a relative position of a top-left corner (or any other point/sample) of the reference block. The BV may indicate a relative displacement from the current block to the reference block that best matches the current block. The encoder may determine the best matching reference block from blocks tested during a searching process (e.g., in a manner similar to that used for inter prediction). The encoder may determine that a reference block is the best matching reference block based on one or more cost criteria. The one or more cost criteria may comprise a rate-distortion criterion (e.g., Lagrangian rate-distortion cost). The one or more cost criteria may be based on, for example, one or more differences (e.g., an SSD, an SAD, an SATD, and/or a difference determined based on a hash function) between the prediction samples of the reference block and the original samples of the current block. A reference block may correspond to/comprise prior decoded blocks of samples of the current picture. The reference block may comprise decoded blocks of samples of the current picture prior to being processed by in-loop filtering operations (e.g., deblocking and/or SAO filtering).

Figure 16:
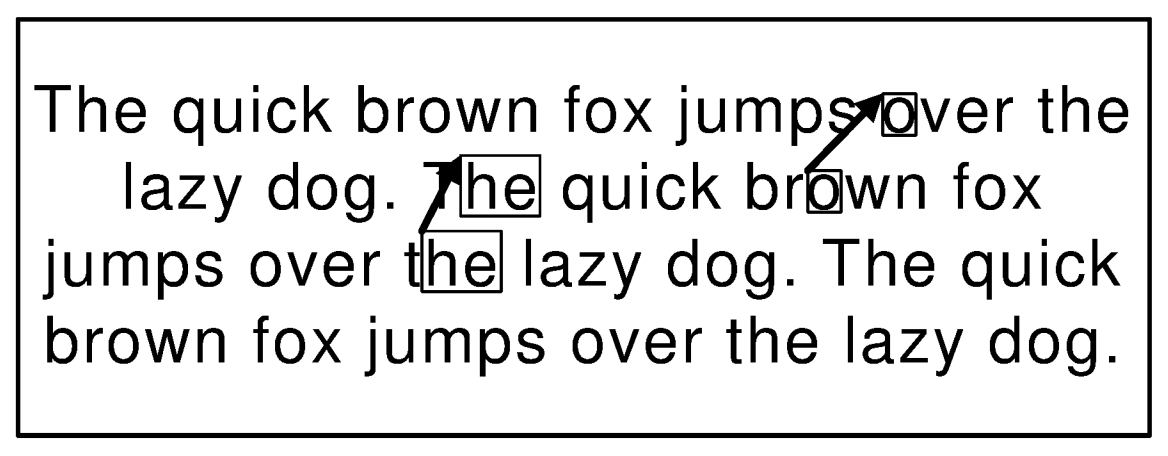

FIG. 16 shows an example of IBC for encoding. The example IBC shown in FIG. 16 may correspond to screen content. The rectangular portions/sections with arrows beginning at their boundaries may be the current blocks being encoded. The rectangular portions/sections that the arrows point to may be the reference blocks for predicting the current blocks.

A reference block may be determined and/or generated, for a current block, for IBC. The encoder may determine a difference (e.g., a corresponding sample-by-sample difference) between the reference block and the current block. The difference may be a prediction error or residual. The encoder may store and/or send/signal, in/via a bitstream the prediction error and/or related prediction information. The prediction error and/or the related prediction information may be used for decoding and/or other forms of consumption. The prediction information may comprise a BV. The prediction information may comprise an indication of the BV. A decoder (e.g., the decoder 300 as shown in FIG. 3), may decode the current block by determining and/or generating the reference block. The decoder may determine and/or generate the current block, for example, based on the prediction information (e.g., the BV). The reference block may correspond to/form (e.g., be considered as) the prediction of the current block. The decoder may decode the current block by combining the prediction with the prediction error.

A BV may be predictively coded (e.g., in HEVC, VVC, and/or any other coding standards/formats/protocols) before being stored and/or sent/signaled in/via a bit stream. The BV for a current block may be predictively coded based on a BV of one or more blocks neighboring the current block. For example, an encoder may predictively code a BV using the merge mode (e.g., in a manner similar to as described herein for inter prediction), AMVP (e.g., as described herein for inter prediction), or a technique similar to AMVP. The technique similar to AMVP may be BV prediction and difference coding (or AMVP for IBC).

An encoder (e.g., the encoder 200 as shown in FIG. 2) performing BV prediction and coding may code a BV as a difference between the BV of a current block being coded and a block vector predictor (BVP). An encoder may select/determine the BVP from a list of candidate BVPs. The candidate BVPs may comprise/correspond to previously decoded BVs of neighboring blocks in the current picture of the current block. The encoder and/or a decoder may generate or determine the list of candidate BVPs.

Figure 17:
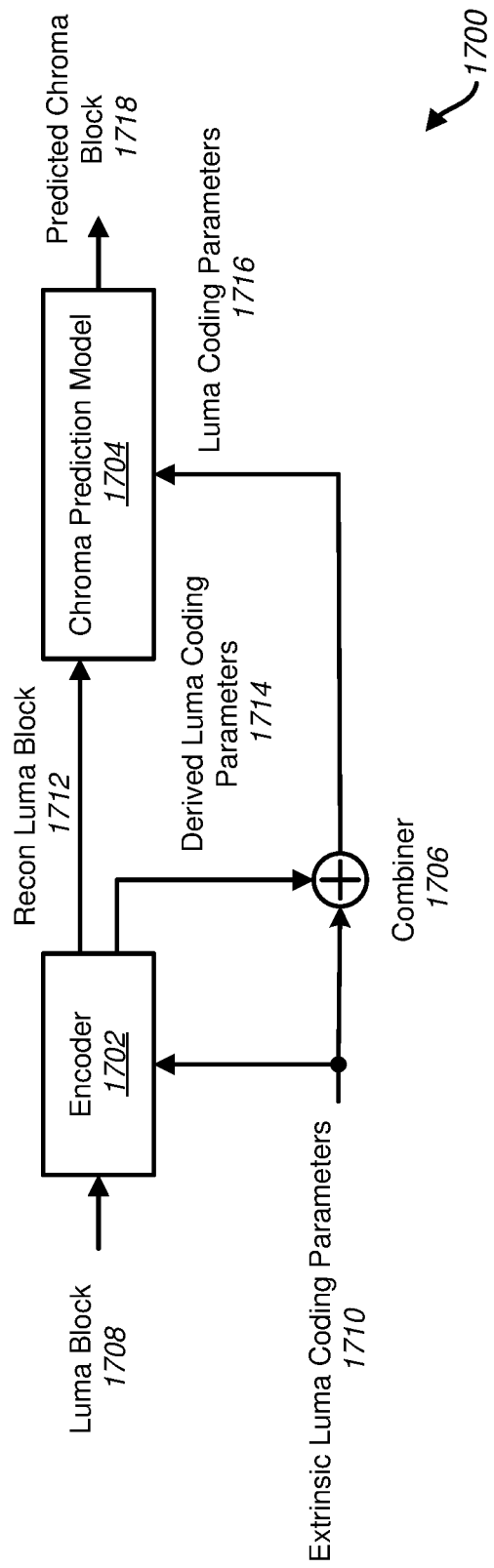
FIG. 17 shows an example of a chroma predictor.

An encoder may signal, in a bitstream, an indication of a selected BVP and/or a BV difference (BVD). An encoder may signal, in a bitstream, an indication of a selected BVP and/or a BV difference (BVD), for example, if the encoder selects a BVP from the list of candidate BVPs. FIG. 17 shows examples of a BVP, BV, and a corresponding BVD (e.g., BVP 1706, BVD 1708 and BV 1710). The encoder may indicate the selected BVP in the bitstream by an index pointing into a list of candidate BVPs. The BVD may be calculated. The BVD may be calculated, for example, based on the difference between the BV of the current block and the selected BVP. The BVD may represented by two components, for example, for a BV represented by a horizontal component ($BV_x$) and a vertical component ($BV_y$) relative to the position of the current block being coded. The BVD may represented by two components calculated as follows:

$$BVD_x = BV_x - BVP_x \quad (17)$$

$$BVD_y = BV_y - BVP_y \quad (18)$$

where $BVD_x$ and $BVD_y$ respectively represent the horizontal and vertical components of the BVD, and $BVP_x$ and $BVP_y$ respectively represent the horizontal and vertical components of the BVP. A decoder (e.g., a decoder as described herein in FIG. 3) may decode the BV. The decoder may decode the BV, for example, by adding the BVD to the BVP indicated in the bitstream. The decoder may decode the current block. The decoder may decode the current block, for example, by determining and/or generating the reference block, that forms the prediction of the current block, using the decoded BV and combining the prediction with the prediction error.

In HEVC and VVC, a list of candidate BVPs may comprise two candidates referred to, for example, as candidates A and B. Candidates A and B may include up to two spatial candidate BVPs derived from five spatial neighboring blocks of the current block being encoded, or one or more of the last two coded BVs if spatial neighboring candidates are not available. Spatial neighboring candidates may not available, for example, because they are coded in intra or inter mode. The location of the five spatial candidate neighboring blocks relative to a current block being encoded using IBC may be the same as those shown in FIG. 15A for inter prediction. The five spatial candidate neighboring blocks are respectively denoted $A_0$, $A_1$, $B_0$, $B_1$, and $B_2$.

In HEVC and VVC, intra prediction (or chroma prediction) may predict the chroma components of a block based on the luma component. For example, in FIG. 11, a chroma pixel of current block 904 may be predicted based on a luma pixel of the reconstructed version of current block 904. Cpred(x, y) may denote the predicted value of the chroma component of current block 904 at the coordinate (x, y). Lrec(x', y') may denote the reconstructed value of the luma component at the coordinate (x', y'), where (x', y') may indicate the corresponding coordinate of the luma component to (x, y) of the chroma component. In a linear chroma prediction model, the predicted value of the chroma component may be calculated as $$C^\wedge pred\ (x,\ y) = \alpha \cdot L^\wedge rec\ (x',\ y') + \beta \quad (14)$$

where α and β are the linear chroma prediction model parameters.

For example, chroma prediction mode using a linear model may refer to a chroma from luma (CfL) prediction mode (e.g., used in AV1), or a cross component linear model (CCLM) prediction mode (e.g., in VVC). A CfL prediction mode may determine the model parameters α and β using least-squares regression based on the reconstructed values of the luma components and the corresponding samples of the chroma component of current block 904. A CCLM prediction mode may derive the model parameters α and β with one or more (e.g., four) chroma samples in the reference samples 902 and their corresponding luma samples. Variations of CCLM prediction mode may be made based on the reference samples 902. For example, CCLM-A prediction mode may derive the model parameters, for example, by selecting chroma samples from the above reference samples. For example, CCLM-L prediction mode may select chroma samples from the left reference samples.

Chroma prediction may be extended from using one linear model to using more than one linear model. For example, multi-model linear model (MMLM) (e.g., proposed in VVC) may have more than one set of the linear model parameters α_i and β_i for i=1, ..., M, where M may be the number of groups for chroma prediction. Each pixel value of the current block may be classified into one of several groups. For example, the classification may be based on the reconstructed value of the luma component and thresholds.

In some coding systems, such as CfL, CCLM, or MMLM, chroma prediction may be performed for a block using a linear model or a piece-wise linear model, for example, to predict chroma pixels from reconstructed luma pixels. A linear model or a piece-wise linear model may not predict the chroma pixels accurately, for example, if the size of the block is large or if colors change abruptly or in irregular manners over the block. Some non-linear models (e.g., neural network (NN) model-based colorization models) that predict more accurate chroma blocks based on reconstructed luma pixels may be overly complex. For example, NN model-based methods may take a block of variable size as an input based on a partition of a CTB. The increased accuracy of the NN model-based colorization methods may not be justified considering the increased complexity.

FIG. 17 shows an example of a chroma predictor 1700. The chroma predictor 1700 may comprise an encoder 1702, a chroma prediction model 1704, and a combiner 1706.

Encoder 1702 may be implemented in the same or similar manner as encoder 200 described herein concerning FIG. 2. Encoder 1702 may receive, for a current block of a video sequence being encoded, a luma block 1708 and one or more extrinsic luma coding parameters 1710. The extrinsic luma coding parameters 1710 may comprise information for determining a reconstructed video quality of the video sequence. For example, the extrinsic luma coding parameters 1710 may comprise one or more of a distortion target.

The distortion target may indicate a threshold (e.g., a maximum threshold) for errors in a reconstruction of the video sequence, a threshold (e.g., a maximum threshold) for a bit rate of a bitstream comprising an encoded version of the video sequence, and/or one or more quantization parameters for determining a step size for quantizing transformed residuals of the current block.

Encoder 1702 may generate, based on luma block 1708 and extrinsic luma coding parameters 1710, a reconstructed luma block 1712, and/or derived luma coding parameters 1714. For example, to generate reconstructed luma block 1712, the encoder 1702 may generate a prediction of luma block 1708 using one of intra prediction, inter prediction, intra block copy, or one or more other prediction techniques. Derived luma coding parameters 1714 may comprise information used to determine the prediction of luma block 1708. Derived luma coding parameters 1714 may comprise one or more of prediction types (e.g., intra, inter, or intra block copy), motion vectors, or prediction modes. The encoder 1702 may generate (e.g., after generating the prediction of luma block 1708) a residual for luma block 1708. The residual may be generated based on a difference between luma block 1708 and the prediction of luma block 1708. Encoder 1702 may determine a coded residual of luma block 1708, for example, based on the residual of luma block 1708 and/or one or more luma coding parameters. Encoder 1702 may transform and/or quantize the residual to determine quantized transform coefficients, for example, using the luma coding parameters. The luma coding parameters may comprise extrinsic luma coding parameters 1710. Encoder 1702 may inverse quantize and inverse transform the quantized transform coefficients to determine a coded residual. Encoder 1702 may combine the coded residual with the prediction of the luma block to form reconstructed luma block 1712. Encoder 1702 may filter reconstructed luma block 1712. Encoder 1702 may combine the coded residual with the prediction of the luma block to form reconstructed luma block 1712. Encoder 1702 may filter reconstructed luma block 1712, for example, before providing reconstructed luma coding block 1712 as an input to chroma prediction model 1704. Chroma prediction model 1704 may receive reconstructed luma block 1712 and/or luma coding parameters 1716. Chroma prediction model 1704 may generate a chroma prediction block 1718 for a chroma block corresponding to luma block 1708 of the current block. For color pictures, a current block of a video sequence being encoded may comprise one or more (e.g., one) luma block and one or more chroma blocks. A chroma block may correspond to a luma block, for example, based on the chroma block belonging to the current block that includes the luma block. Chroma prediction model 1704 may generate chroma prediction block 1718 based on reconstructed luma block 1712 and/or luma coding parameters 1716. Chroma prediction model 1704 may process luma coding parameters 1716 to generate similar chroma prediction blocks from different reconstructions of the same luma block, for example, based on respective luma coding parameters 1716. Additionally or alternatively, the chroma prediction model 1704 may use one of extrinsic luma coding parameters 1710 or derived luma coding parameters 1714. Combiner 1706 may concatenate extrinsic luma coding parameters 1710 with derived luma coding parameters 1714 to determine luma coding parameters 1716, for example, if both extrinsic luma coding parameters 1710 and derived luma coding parameters 1714 are used by chroma prediction model 1704.

Encoder 1702 may determine a residual for the chroma block corresponding to luma block 1708, for example, based on a difference between the chroma block and chroma prediction block 1718. Encoder 1702 may determine a coded residual of the chroma block, for example, based on the residual of the chroma block. Encoder 1702 may signal the coded residual of the chroma block in a bitstream based on, for example, a syntax structure. Encoder 1702 may signal a chroma prediction mode in a bitstream based on, for example, a syntax structure.

In HEVC, VVC, or other video coding systems, an encoder may signal information of a coded video sequence in a bitstream based on syntax structures, and/or a decoder may extract the information of a coded video sequence from a bitstream based on syntax structures. A syntax structure may represent a logical entity of the information coded in the bitstream. The logical entities, associated with the coded video sequence, may include, for example, parameter sets, slices, and coding tree units. Within HEVC and/or VCC, the syntax structures may be specified by syntax tables that indicate variations of the syntax structures. Syntax structures may comprise syntax elements. Syntax elements may occur as flags, values, one-dimensional arrays, or multi-dimensional arrays. For arrays, one or more indices may be used to reference a specific element within the array. The occurrence of a syntax element within a syntax structure may be conditional. For example, the occurrence of a syntax element may be conditional on the value of one or more other syntax elements or values determined, for example, if decoding occurs.

The chroma prediction mode may be included in the syntax structure, for example, as a syntax element. For example, the syntax element may be a one-bit flag that indicates whether the chroma prediction model 1704 is used or not. For example, in HEVC and/or VVC, a chroma intra prediction mode of a current block may include the one-bit flag of the chroma prediction model 1704. Additionally or alternatively, in HEVC and/or VVC, a chroma intra prediction mode of a current block may include a new chroma prediction mode using chroma prediction model 1704. Encoder 1702 may replace cclm_mode_flag in VVC with the chroma prediction mode. Additionally or alternatively, encoder 1702 may incorporate the chroma prediction mode with CCLM in VVC, for example, by augmenting cclm_mode_idx with the chroma prediction mode.

Chroma prediction model 1704 may be based on a NN model. NN models may use one or more layers of nonlinear units to generate an output for a received input. Some NN models may include one or more hidden layers in addition to an output layer. The output of each hidden layer may be used as input to the next layer (e.g., the next hidden layer or the output layer). A nonlinear unit may comprise weights and/or one or more non-linear functions. A nonlinear unit may multiply each input by the corresponding weight, sum the results, and use (e.g., apply) a non-linear function to the sum. The nonlinear unit may pass the outcome to the output of the unit. A training process may determine weights of chroma prediction model 1704 by attempting to reduce a loss function over a training set, for example, using a gradient-based method. The training set may comprise the chroma block and the corresponding inputs of chroma prediction model 1704. The loss function may be a difference between the chroma block and the prediction of the chroma block 1718. The training process may update the weights in the opposite direction of the gradient of the weights with respect to the loss function.

Figure 18:
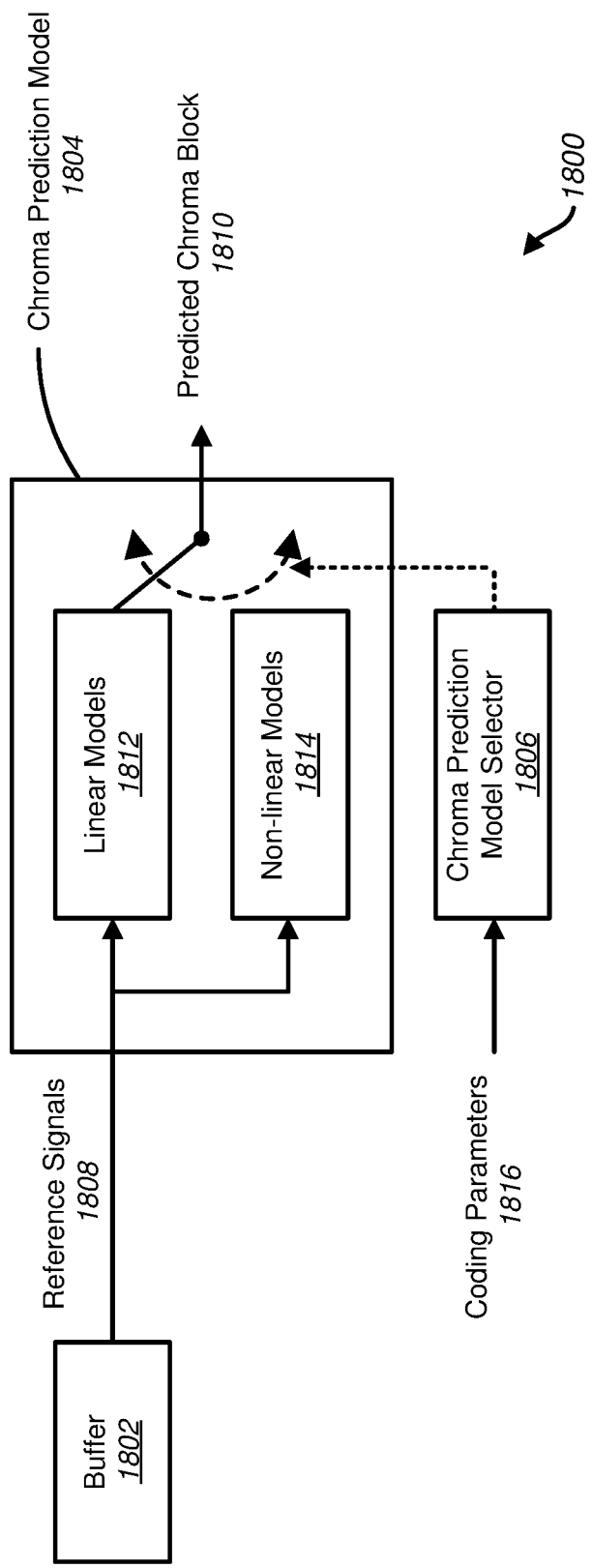
FIG. 18 shows an example of a chroma predictor.

FIG. 18 shows an example chroma predictor 1800. Chroma predictor 1800 may be implemented as a decoder. Chroma predictor 1800 may comprise a buffer 1802, a chroma prediction model 1804, and a chroma prediction model selector 1806. One, some, or all components of the chroma predictor 1800 may be implemented similarly to corresponding components as depicted with respect to the chroma predictor 1700 in FIG. 17. Chroma prediction model 1804 may be configured to receive reference signals 1808 from buffer 1802. Chroma prediction model 1804 may generate a prediction 1810 of a chroma block based on reference signals 1808. Buffer 1802 may store reference signals 1808.

Figure 19:
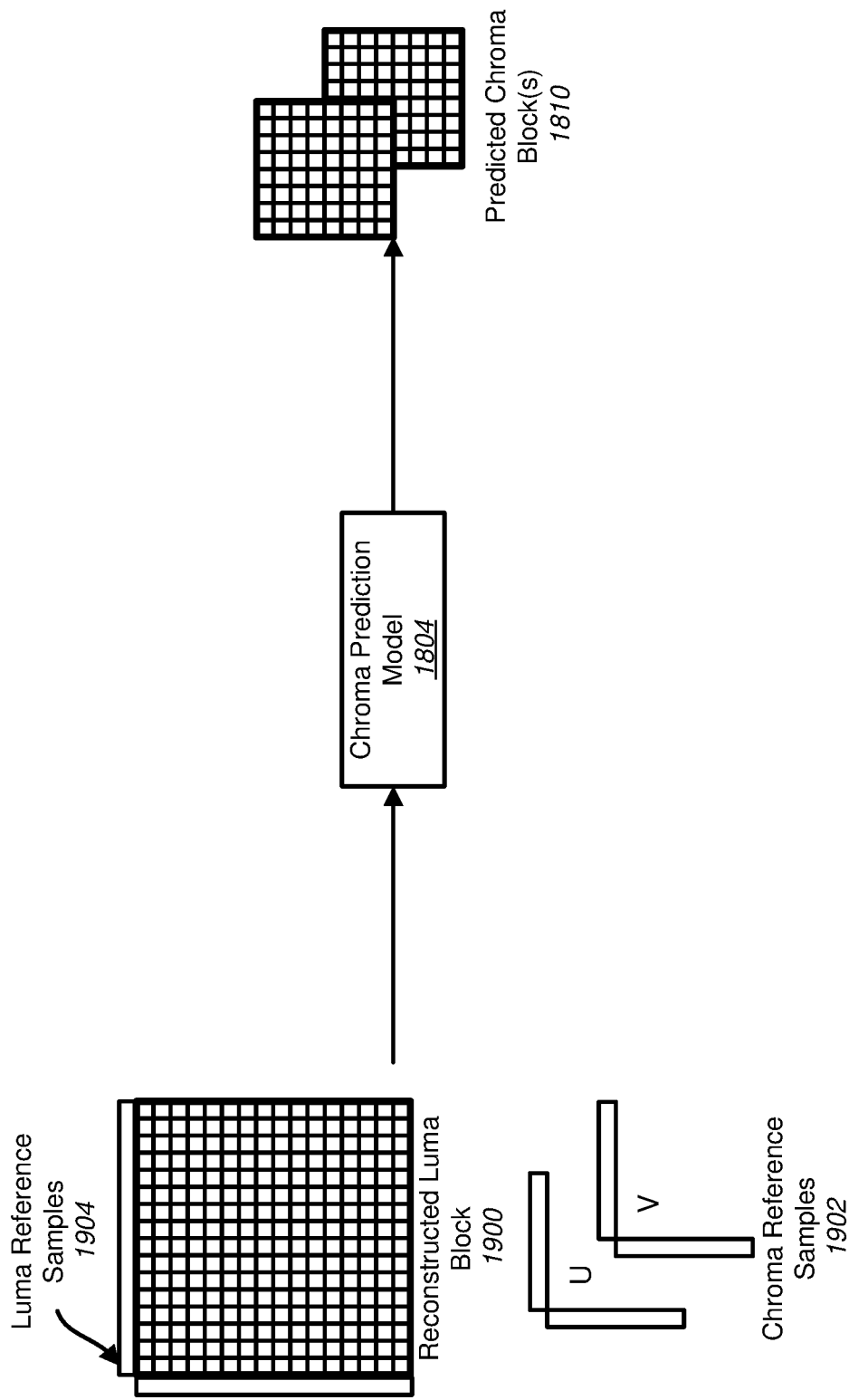
FIG. 19 shows example reference signals.

FIG. 19 shows example reference signals. Reference signals are shown in FIG. 19 may be reference signals 1808 in FIG. 18. The reference signals may include one or more of: one or more (e.g., one) reconstructed luma block 1900, one or more chroma reference samples 1902, and/or one or more luma reference samples 1904. Chroma reference samples 1902 and/or luma reference samples 1904 may or may not be available. The availability of each of chroma reference sample 1902 and/or luma reference samples 1904 may be based on the position of a current block in a picture. For example, the above adjacent line of reference samples may not be available for the uppermost current block in a picture. The left adjacent line of reference samples may not be available for the leftmost current block in a picture. Reference signals 1808 may be processed by filtering operations (e.g., deblocking or SAO filtering), for example, prior to being stored in buffer 1802.

The three components (e.g., one luma component and two chroma components as depicted in FIG. 19) may be coded in an order. For example, the luma component may be coded and/or reconstructed first, for example, before the chroma components are coded. Chroma prediction model 1804 may utilize correlations between the luma component(s) and chroma component(s). Chroma prediction model 1804 may predict chroma pixels of a coding block from the reconstructed luma pixels. Chroma prediction model selector 1806 may determine candidates of chroma prediction model 1804 and select chroma prediction model 1804. An encoder may generate prediction 1810 of the chroma block by exploiting (e.g., comparing) the candidates of chroma prediction models. The chroma prediction model selector 1806 may select a chroma prediction model, from the candidate chroma prediction models, for example, based on a compromise between coding efficiency and complexity. A decoder may generate prediction 1810 of a chroma block by using (e.g., applying) the selected chroma prediction model 1804.

Linear chroma prediction models may assume a linear correlation between the luma and the chroma components in a coding block and/or predict chroma pixels based on linear regression. The linear correlation assumption may be valid, for example, if the coding block has small variations in color. The linear correlation assumption may be inaccurate for blocks with complex image contents or with a large size, for example, because different objects may have different colors or irrelevant colors.

Non-linear chroma prediction models, such as NN model-based methods, may accurately capture the correlation between the luma and the chroma components. Non-linear chroma prediction models may be much more complex than linear chroma prediction models. The complexity of encoding may be increased (e.g., proportionally to the number of variable block sizes that the non-linear chroma prediction model is used with or applied to).

As described herein, chroma prediction model selector 1806 may generate candidates from linear models 1812 and non-linear models 1814 in chroma prediction model 1804. Chroma prediction model 1804 may be configured to receive reference signals 1808 and generate a prediction 1810 of a chroma block. Linear models 1812 may predict chroma samples based on a linear equation (e.g., equation (14)). The linear models 1812 may comprise one or more of CIL, CCLM, CCLM-A, CCLM-L, or piece-wise linear models (e.g., MMLM). Non-linear models 1814 may be NN model-based methods (e.g., chroma prediction neural network models (CPNNM)).

Chroma prediction model selector 1806 may be configured with one or more decision rules for determining one or more (e.g., one) models, among linear models 1812 and/or non-linear models 1814, to generate prediction 1810 from reference signals 1808. Chroma prediction model selector 1806 may comprise a decision rule that determines one or more (e.g., one) models, among linear models 1812 and/or non-linear models 1814, based on coding parameters 1816. Coding parameters 1816 may comprise one or more of the parameters of coding tree structures (e.g., a quadtree depth in a CTB, or a size of a CB). A CB of a larger size is more likely to have complex image contents than a CB of a comparatively smaller size. The linear correlation assumption between the luma and the chroma components may no longer be appropriate as CBs become larger. Non-linear models may be more likely to make up for the shortcomings of linear models for a larger CB. Additionally or alternatively, coding parameters 1816 may comprise quantization parameters. Quantization parameters may affect a visual quality of a reconstruction of a CB. The blocks reconstructed with smaller quantization parameters may have more complex details than those with larger quantization parameters.

The decision rule may determine candidates of the chroma prediction model 1804 from one or more linear models and/or non-linear models. Chroma prediction model selector 1806 may select chroma prediction model 1804 from candidates. A prediction 1810 may be generated using the selected chroma prediction model 1804. The decision rule may be based on coding parameters 1816. For example, coding parameters 1816 may comprise a horizontal size and a vertical size of chroma components of the CB. The candidates may comprise one or more non-linear models based on the horizontal size being equal to or larger than a first threshold and/or the vertical size being equal to or larger than a second threshold. The candidates may comprise the one or more linear models based on the horizontal size being equal to or less than a third threshold and/or the vertical size being equal to or less than a fourth threshold. The first threshold may be equal to the third threshold. The second threshold may be equal to the fourth threshold. Additionally or alternatively, coding parameters 1816 may comprise a number of pixels of the chroma component of the CB. The candidates may comprise the one or more non-linear models based on the number of pixels being equal to or larger than a fifth threshold. The candidates may comprise the one or more linear models based on the number of pixels of the chroma block being equal to or less than a sixth threshold. The fifth threshold may be equal to the sixth threshold.

Coding parameters 1816 may comprise a depth of the CB in a coding tree structure. The candidates may comprise the one or more non-linear models based on the depth being equal to or less than a seventh threshold. The candidates may comprise the one or more linear models based on the depth being equal to or larger than an eighth threshold. The seventh threshold may be equal to the eighth threshold.

Alternatively or additionally, coding parameters 1816 may comprise a ratio of the horizontal size to the vertical size of the CB. The candidates may comprise the one or more linear models based on the maximum of the ratio and/or the reciprocal of the ratio being equal to or larger than a ninth threshold. The candidates may comprise the one or more non-linear models based on the maximum of the ratio and/or the reciprocal of the ratio being equal to or less than a tenth threshold. The ninth threshold may be equal to the tenth threshold.

Coding parameters 1816 may include one or more quantization parameters. For example, the candidates may comprise the one or more non-linear models based on the quantization parameters being equal to or less than an eleventh threshold. The candidates may comprise the one or more linear models based on the quantization parameters being equal to or smaller than a twelfth threshold. The eleventh threshold may be equal to the twelfth threshold.

Chroma prediction model selector 1806 may determine candidates based on the decision rule and/or coding parameters 1816. Chroma predictor 1800 may generate prediction 1810 of the chroma components of the current block, for example, based on the candidates and/or reference signals 1808. An encoder may determine a chroma prediction model 1804 from the candidates, for example, based on one or more cost criteria. The encoder may signal an indication of the chroma prediction model 1804 from the candidates and/or coding parameters 1816. The encoder may signal the decision rule and/or the associated thresholds in the parameter set (e.g., the sequence parameter set or the picture parameter set).

A decoder may receive a decision rule and/or the associated thresholds. The decoder may be configured to receive coding parameters 1816 and/or an indication of the chroma prediction model 1804. Chroma prediction model selector 1806 may determine candidates, for example, based on the decision rule and/or coding parameters 1816. The decoder may determine the chroma prediction model 1804 from the candidates, for example, based on the indication of chroma prediction model 1804. Chroma predictor 1800 may generate prediction 1810 of the chroma components of the current block, for example, based on the candidates and/or reference signals 1808.

Figure 20:
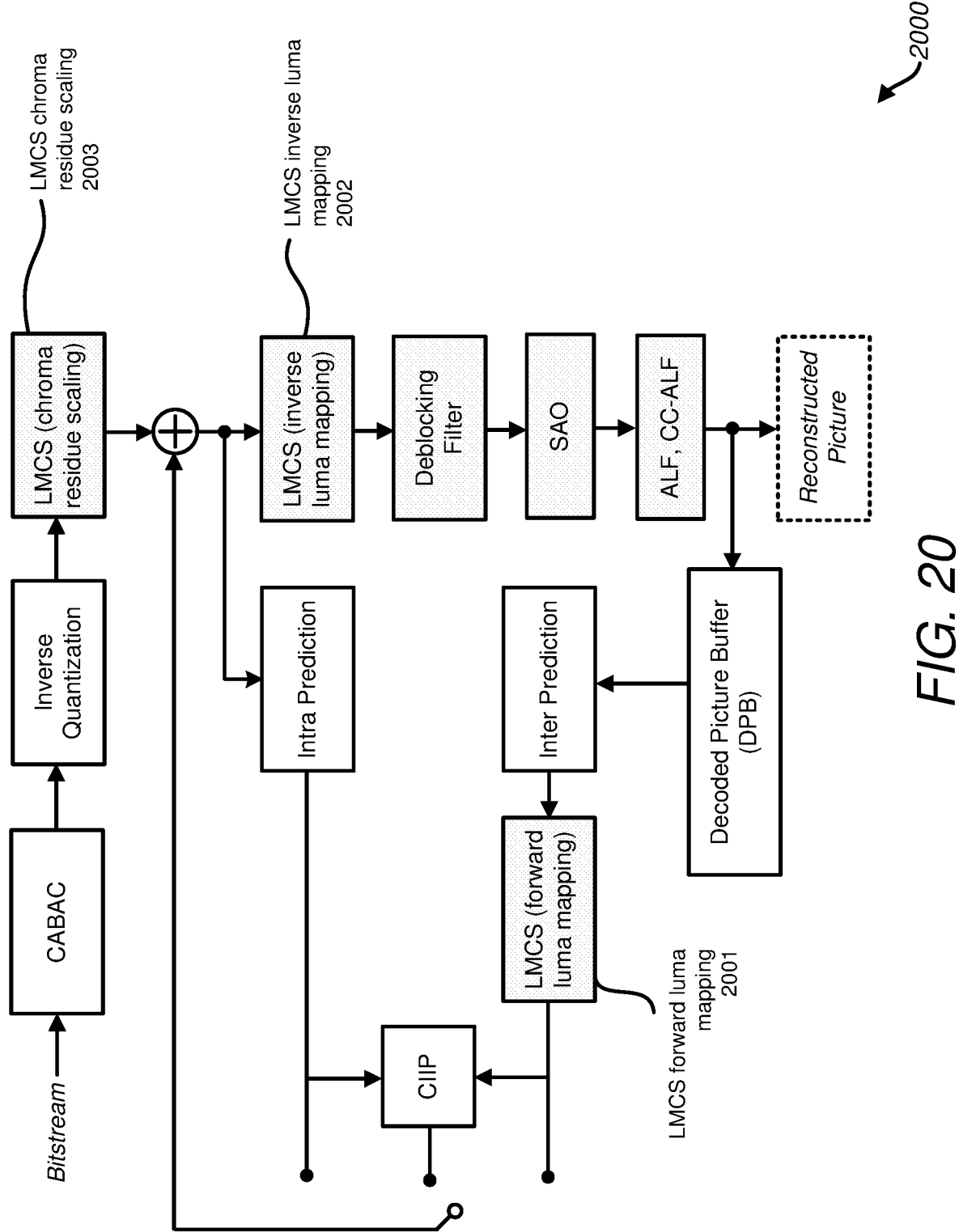
FIG. 20 shows an example encoder for luma mapping and/or luma-dependent chroma residue scaling.

FIG. 20 shows an example encoder for luma mapping and/or luma-dependent chroma residue scaling An encoder (e.g., encoder 2000 as shown in FIG. 20) may be a VVC encoder or an ECM encoder. The encoder 2000 may include a set of in-loop filters comprising at least one of: a Deblocking Filter (DBF) for reducing the blocking artifacts; a Sample Adaptive Offset (SAO) filter for attenuating the ringing artifacts and correcting the local average intensity changes; an Adaptive Loop Filtering (ALF); and/or a Cross-Component Adaptive Loop Filtering (CC-ALF) filter. The ALF and/or CC-ALF may be configured to further correct the signal based on linear filtering and/or adaptive clipping.

Luma Mapping with Chroma Scaling (LMCS) may be performed. LMCS may not specifically address the coding artifacts reduction. The LMCS may aim at better using the signal range for improved coding efficiency. LMCS may involve two different components: luma mapping (LM) and luma-dependent chroma residue scaling (CS).

Luma mapping may be used/configured to make better use of the range of luma code values at a specified bit depth. This may be helpful, for example, if some luma code values are not used in the input video. The chroma scaling may be configured to compensate for the luma mapping impact on the bit cost repartition between the luma signal and the chroma signal. Encoder 2000 may comprise LMCS forward luma mapping 2001, LMCS inverse luma mapping 2002, and/or LMCS chroma residue scaling 2003. As described further herein, the LMCS forward luma mapping 2001, LMCS inverse luma mapping 2002, and/or LMCS chroma residue scaling 2003 may be configured to perform LMCS. The LMCS forward luma mapping 2001, LMCS inverse luma mapping 2002, and/or LMCS chroma residue scaling 2003 may be implemented similarly to LMCS forward luma mapping 2101, LMCS inverse luma mapping 2102, and/or LMCS chroma residue scaling 2103 in FIG. 21 respectively.

Figure 21:
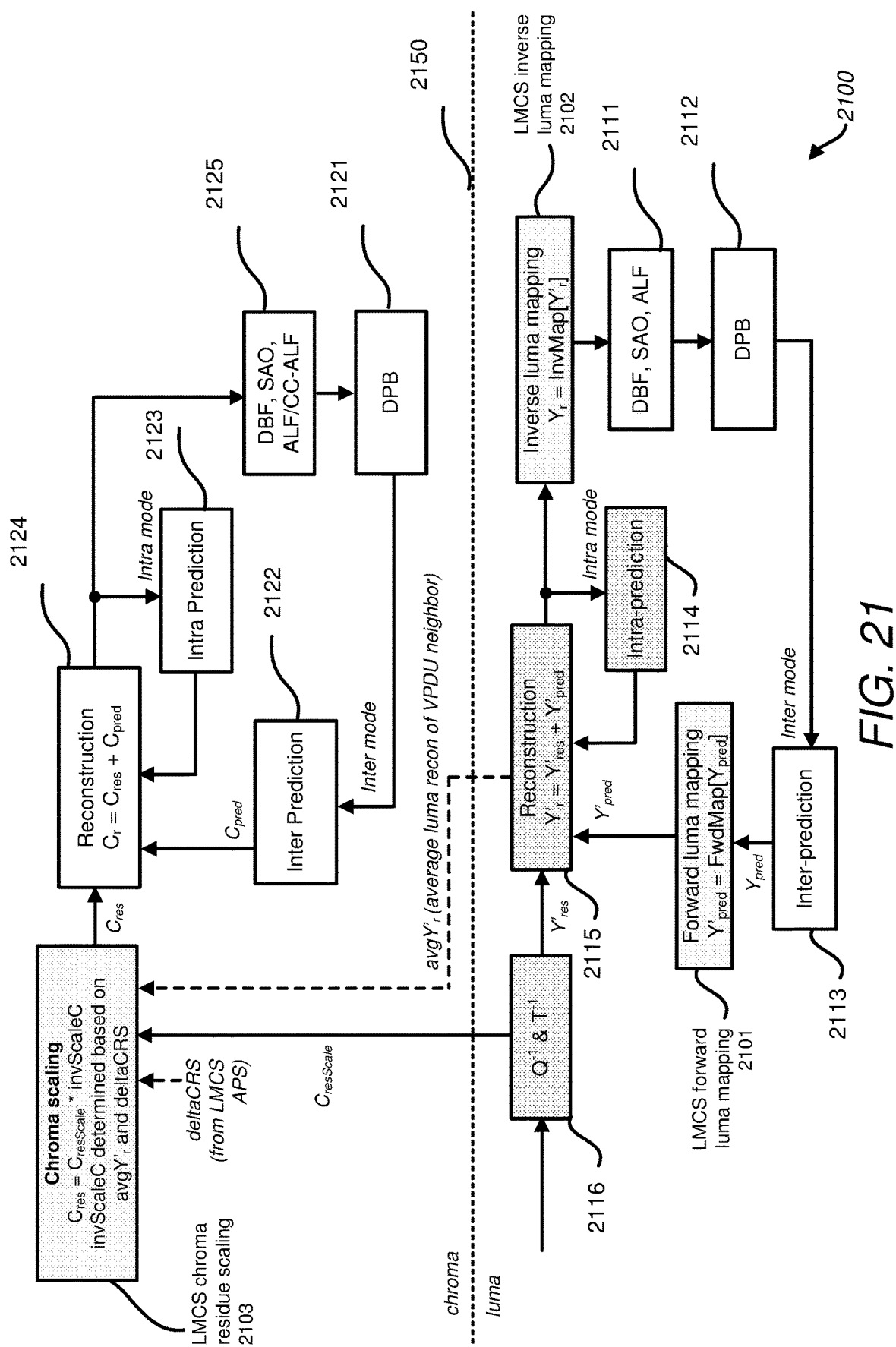
FIG. 21 shows an example decoder for luma mapping and/or luma-dependent chroma residue scaling.

FIG. 21 shows an example decoder for luma mapping and/or LMCS. Encoder 2000 and decoder 2100 may perform LMCS similarly. Each component described with respect to FIG. 20 may be implemented similarly to the corresponding component described with respect to FIG. 21A decoder (e.g., decoder 2100 as shown in FIG. 21) may comprise LMCS forward luma mapping 2101, LMCS inverse luma mapping 2102, and/or LMCS chroma residue scaling 2103 as described further herein. As shown in FIG. 21, a dashed line 2150 divides the decoder 2100 into two parts. The upper part (above the dashed line 2150) may show the chroma scaling (CS). The lower part (below the dashed line 2150) may show the luma mapping (LM).

LMCS may comprise mapping the luma code values of an input video signal from the original (unmapped) sample domain to a mapped sample domain. Sample values are transformed between the two domains. As shown in FIG. 21, inverse quantization (Q 1) and inverse transform (T 1) 2116, luma intra prediction (Intra Prediction 2114), and summing the luma prediction with the luma residue values (Reconstruction 2115) may be performed in the mapped sample domain. The in-loop filters (deblocking, SAO, ALF) 2121 and 2125, inter prediction 2113 and 2122, chroma intra prediction 2123, summing chroma prediction with the chroma residue values (Reconstruction 2214) and/or storage of pictures in a decoded picture buffer (DPB) 2121 and 2112 may be performed in the original sample domain. As described herein, forward luma mapping 2101 may map the luma code values from the original sample domain to the mapped sample domain. Inverse luma mapping 2102 may map the luma code values from the mapped sample domain back to the original sample domain. Chroma Scaling 2103 may determine a chroma scaling factor and/or scale the chroma residue values according to the scaling factor.

The inverse quantization and inverse transform 2116 may be used with (e.g., applied to) the decoded luma transform coefficients and/or produce the luma residues (referred to as Y'res) in the mapped sample domain. Reconstructed luma sample values (referred to as Y'r) in the mapped sample domain may be obtained (e.g., after the inverse quantization and inverse transform 2116 is used/applied) by summing Y'res with the corresponding predicted luma values (referred to as Y'pred) in the mapped sample domain. For intra prediction, Y'pred may be obtained by performing intra prediction in a mapped sample domain. For inter prediction, the predicted luma values (referred to as Ypred) in the original sample domain, may be obtained by motion compensation using reference pictures from the DPB. Forward luma mapping may be used with (e.g., applied to) Ypred to produce the luma values Y'pred in the mapped sample domain. Reconstructed values, which may be the sum of Y'pred and Y'res, may be inverse-mapped and/or processed by other in-loop filters (e.g., before being stored in the DPB in the original sample domain).

In at least some systems (e.g., VVC systems), Template Matching (TM) with IBC may be used for both IBC merge mode and IBC AMVP mode. An IBC-TM merge list may be generated, for example, based on the TM cost estimation for each of a plurality of candidate RBs. The IBC-TM merge list may comprise one or more candidate RBs. The IBC-TM merge list may be different from (e.g., modified from) the IBC merge list in regular IBC merge mode (without TM cost estimation). The IBC-TM merge list may comprise candidates that are selected based on a pruning method. A motion distance may exist between the candidates, as in the regular TM merge mode. An ending zero motion fulfillment (which may be invalid for Intra coding) may be replaced (e.g., if the modification from a regular list to an IBC-TM merge list occurs) by one or more motion vectors (e.g., motion vectors to the left (−W, 0), top (0, −H) and/or top-left (−W, −H), where W is the width and H the height of the current CU). In an IBC-TM merge mode, the selected candidates may be refined with the Template Matching method (e.g., prior to the RDO or decoding). An encoder or decoder may select the IBC-TM merge mode the regular IBC merge mode. A TM-merge flag may be signaled, for example, if the IBC-TM merge mode is selected. In IBC-TM AMVP mode, one or more candidates (e.g., up to three candidates) may be selected from the IBC-TM merge list. Each of the selected candidates may be refined using the Template Matching method and sorted based on the TM cost corresponding to each of the selected candidates. Less than all of the selected candidates (e.g., two candidates) may be used (e.g., considered) in the motion estimation.

Template Matching (TM) refinement (e.g., for IBC-TM merge mode and/or AMVP modes) may be simplified. The simplification may be based on IBC motion vectors that are constrained: (i) to be an integer; and (ii) within a reference region. In IBC-TM merge mode, refinements (e.g., all or some refinements) may be performed at integer precision. In IBC-TM AMVP mode, the refinements (e.g., all or some refinements) may be performed either at integer or 4-pel precision, for example, depending on the AMVR value. Such a refinement may access samples without interpolation. The refined motion vectors and/or the template used in each refinement step may follow the constraint of the reference region, for example, in the IBC-TM merge mode and/or IBC-TM AMVP mode.

In at least some systems (e.g., VVC systems), a template matching cost may be determined, for example, if Intra Block Copy (IBC) is used for encoding or decoding a block within a picture. Template matching cost may not be determined accurately, for example, if the samples are of different types, from different blocks, and/or in different domains. For example, samples belonging to a template of a current block may be in a spatial (e.g., original or non-mapped) domain. Samples belonging to the template(s) of a candidate reference block may be in an LMCS-mapped domain (e.g. before LMCS inverse luma mapping is used/applied). Using samples of different domains for a template matching cost estimation may cause an inaccurate result, which may lead to inefficiencies in subsequent data processing that is based on the inaccurate template matching cost.

As described herein, samples of a current block (CB) and a reference block (RB) may be harmonized (e.g., luma mapped to a same domain), instead of one being in a spatial (e.g., original or non-mapped) domain and the other being in the LMCS mapped domain. This may result in improved accuracy of a template matching cost estimation. An inverse luma mapping may be used with (e.g., applied to) samples of a template of the CB and/or of a template of the RB, for example, before the template matching cost is determined. A template matching cost for the candidate RB may be determined (e.g., calculated) based on a difference between the inversely luma mapped samples of the template of the CB, and/or the inversely luma mapped samples of the template of the RB. Additionally or alternatively, the template matching cost for the candidate RB may be calculated based on a difference between samples of a template of the CB in a LMCS mapped domain and samples of a template of the RB in the LMCS mapped domain. A determination may be made as to whether to perform inverse luma mapping of the samples in the candidate RB and/or samples in the CB. In this way, the accuracy of template matching cost estimation and hence the efficiency of IBC may be improved.

Figure 22:
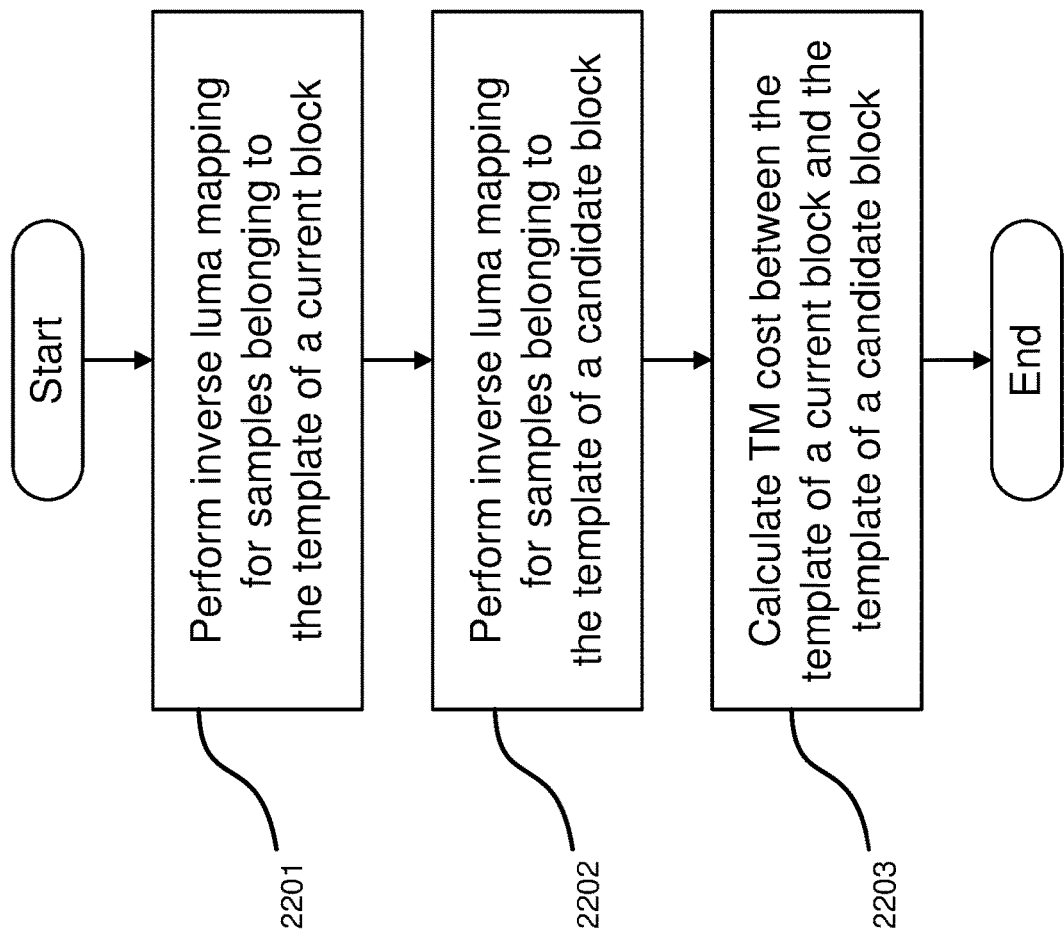
FIG. 22 shows a method for luma mapping.

FIG. 22 shows a method for luma mapping. Samples of a current block and samples of a reference block may be harmonized (e.g., luma mapped to a same domain). For example, samples of a current block and samples of a reference block may be mapped to a spatial domain (e.g., a domain where LMCS inverse luma mapping is used/applied). The samples in the spatial domain may be used to determine template matching cost.

At step 2201, a template of a current block (CB) may be obtained. The template of a current block (CB) may be in a LMCS (mapped) domain. The template of the CB may comprise one or more samples. LMCS mapping may have been used with (e.g., applied to) the samples. At step 2201, LMCS inverse luma mapping may be performed on the one or more samples of the CB. The template of the CB may be transformed, based on the LMCS inverse luma mapping, to a spatial domain. At step 2202, a template of a candidate reference block (RB) may be obtained. The template of the candidate RB may be in a LMCS (mapped) domain. The template of the candidate RB may comprise one or more samples. LMCS mapping may have been performed on the one or more samples of the candidate RB. At step 2202, LMCS inverse luma mapping may be performed on the one or more samples belonging to the template of the candidate RB. The template of the candidate RB may be transformed, based on the LMCS inverse luma mapping, to a spatial domain (e.g., the same spatial domain to which the template of the CB is transformed). At step 2203, a template matching (TM) cost may be determined (e.g., computed) between the template of the CB and the template of the candidate RB, for example, based on the samples of both templates being in the spatial domain.

Figure 23:
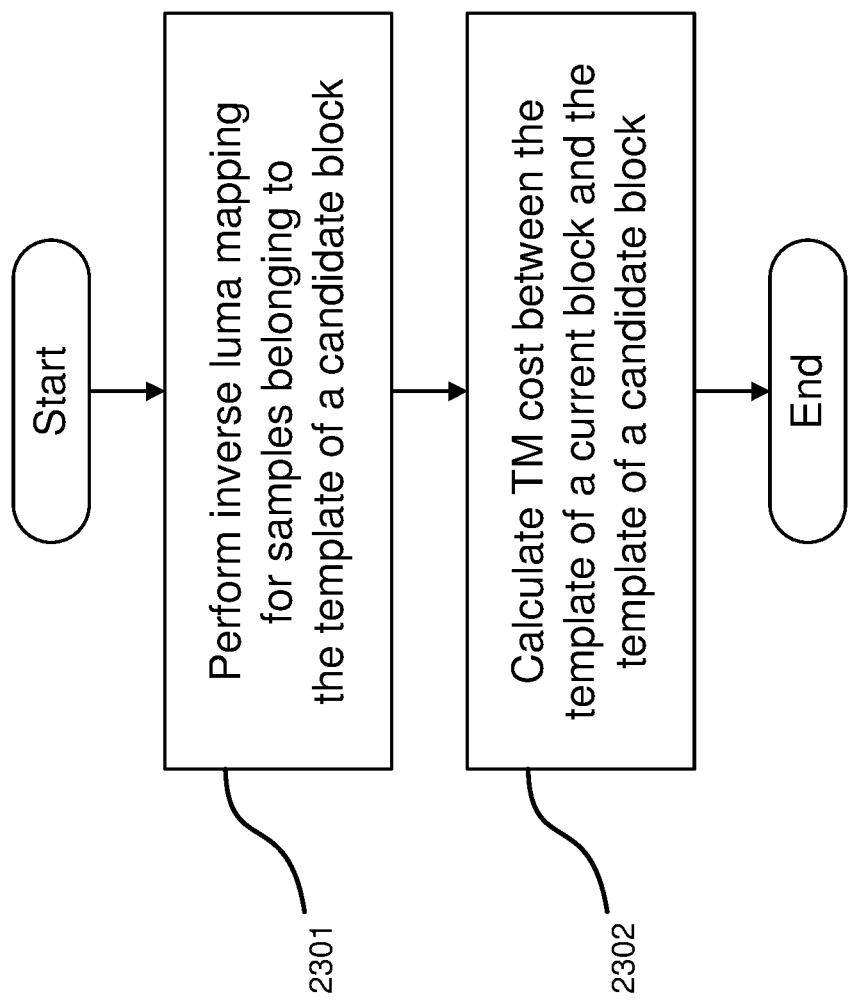
FIG. 23 shows a method for luma mapping.

FIG. 23 shows a method for luma mapping. Samples of a current block and/or samples of a reference block may be harmonized (e.g., mapped to a same domain). The mapped samples may be used to determine the template matching cost. The mapped samples may be in a spatial domain.

At step 2301, samples belonging to a template of a candidate RB may be obtained. Inverse luma mapping (e.g., LMCS inverse luma mapping) may be performed for samples belonging to the template of the candidate RB. Samples belonging to a template of a CB may have been inversely mapped to a spatial domain. At step 2302, a template matching (TM) cost may be determined (e.g., computed, calculated) between the template of the CB and the template of the candidate RB, for example, based on the samples of both templates being in the spatial domain.

Figure 24:
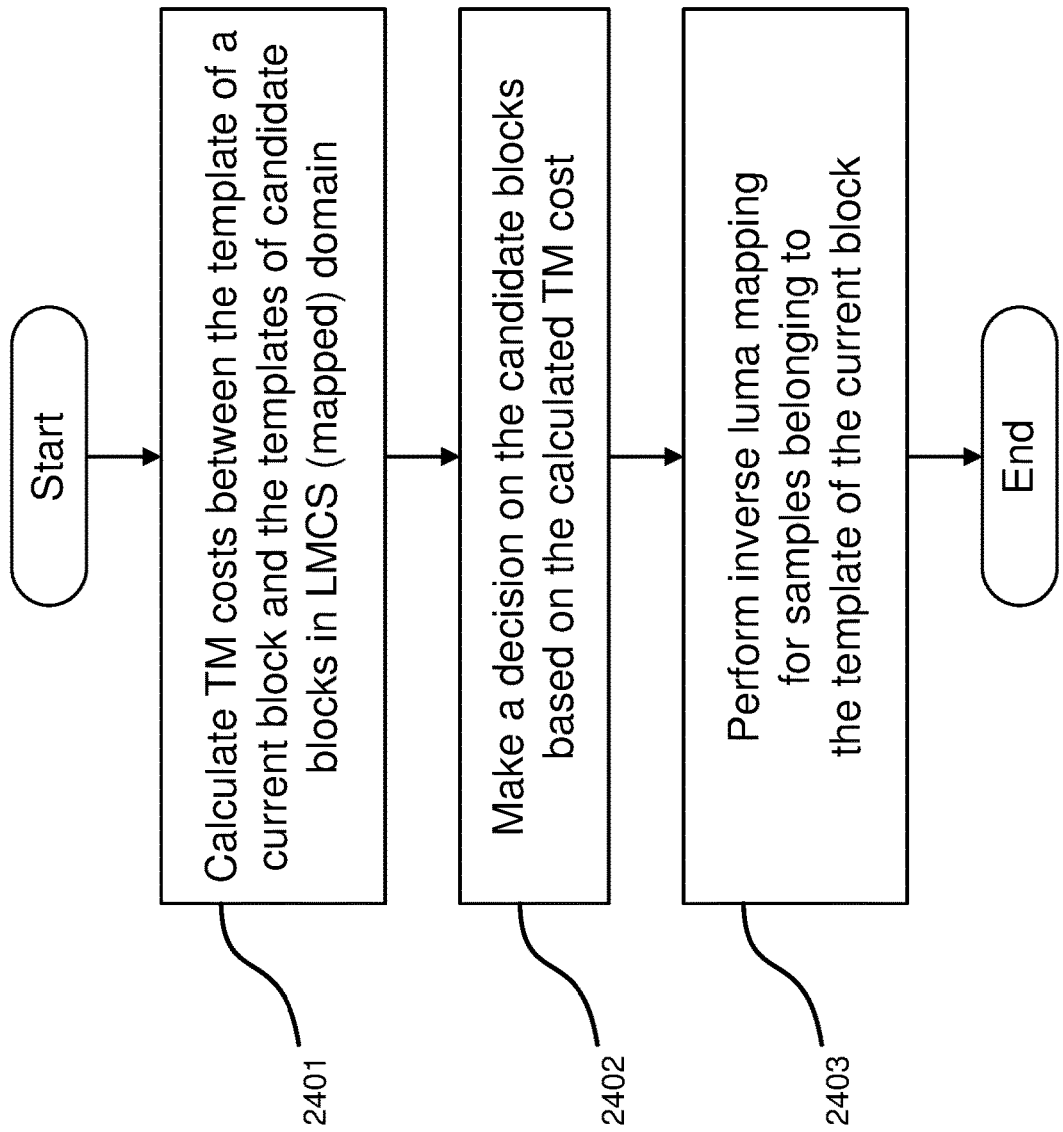
FIG. 24 shows a method for luma mapping.

FIG. 24 shows a method for luma mapping. Samples of a current block and/or samples of a reference block may be harmonized (e.g., mapped to a same domain). The mapped samples may be used to determine template matching cost. The mapped samples may be in a LMCS (mapped) domain.

At step 2401, a template of the CB may be obtained. One or more templates each from a candidate RB, of one or more RBs, may be obtained. Samples belonging to the template of the current block may be in a LMCS (mapped) domain. Samples belonging to the one or more templates of the one or more candidate reference blocks may be in an LMCS (mapped) domain. At step 2401, TM costs between the template of the CB and the templates of candidate reference blocks may be determined (e.g., calculated) in the LMCS (mapped) domain. At step 2402, one or more candidate reference blocks may be determined (e.g., selected) based on the obtained TM costs for the candidate reference blocks. At step 2403, inverse luma mapping for samples belonging to the template of the current block may be performed, for example, if the samples are used in further operations.

In at least some systems, TM-based tools (e.g., TM-based merge list sorting, MVD prediction, TM-based reference picture list sorting) for inter prediction may use templates of candidate reference blocks in a spatial domain. TM-based tools for intra prediction may use templates of candidate reference blocks in an LMCS (mapped) domain. It may be ambiguous as to which domain to use, for example, if determining (e.g., calculating) template matching costs (e.g., for selecting one or more best candidate reference blocks). This ambiguity may arise, for example, since inter template matching is performed in a spatial domain, and IBC template matching is performed in an LMCS domain. A domain may be selected for template matching cost determination. The domain selection may be based on codec implementation, performance requirements, and other criteria. Template matching may be performed for templates of different domains. Template samples for a current block may be mapped from an LMCS domain to a non-LMCS domain, and/or reference block templates may be kept in an LMCS domain. Reference block templates may not be inversely mapped to a normal (original or spatial) domain, for example, if template matching cost is to be determined in an original/normal/spatial domain. An example of template matching in a same domain is described herein with respect to and illustrated by FIG. 24.

Examples described herein may be used with (e.g., applied to) IBC blocks within I-slices, P-slices, and/or B-slices. I-slices may comprise intra-predicted blocks. P-slices and/or B-slices may comprise intra-predicted blocks and/or inter-predicted blocks. Intra prediction may be performed in an LMCS (mapped) domain. Samples (e.g., samples of pictures) in the decoded picture buffer (DPB) may be stored in the spatial domain (e.g., after LMCS inverse mapping). This inconsistency between spatial and LMCS (mapped) domains may cause implementation difficulties for IBC TM-based tools. For example, an IBC TM-based tool may be based on an intra prediction and/or share concepts or implementation details with inter prediction. A determination may be made as to whether a spatial domain or an LMCS (mapped) domain is to be used for determining (e.g., calculating) TM cost. For example, the determination may be made based on hardware constraints.

Figure 25:
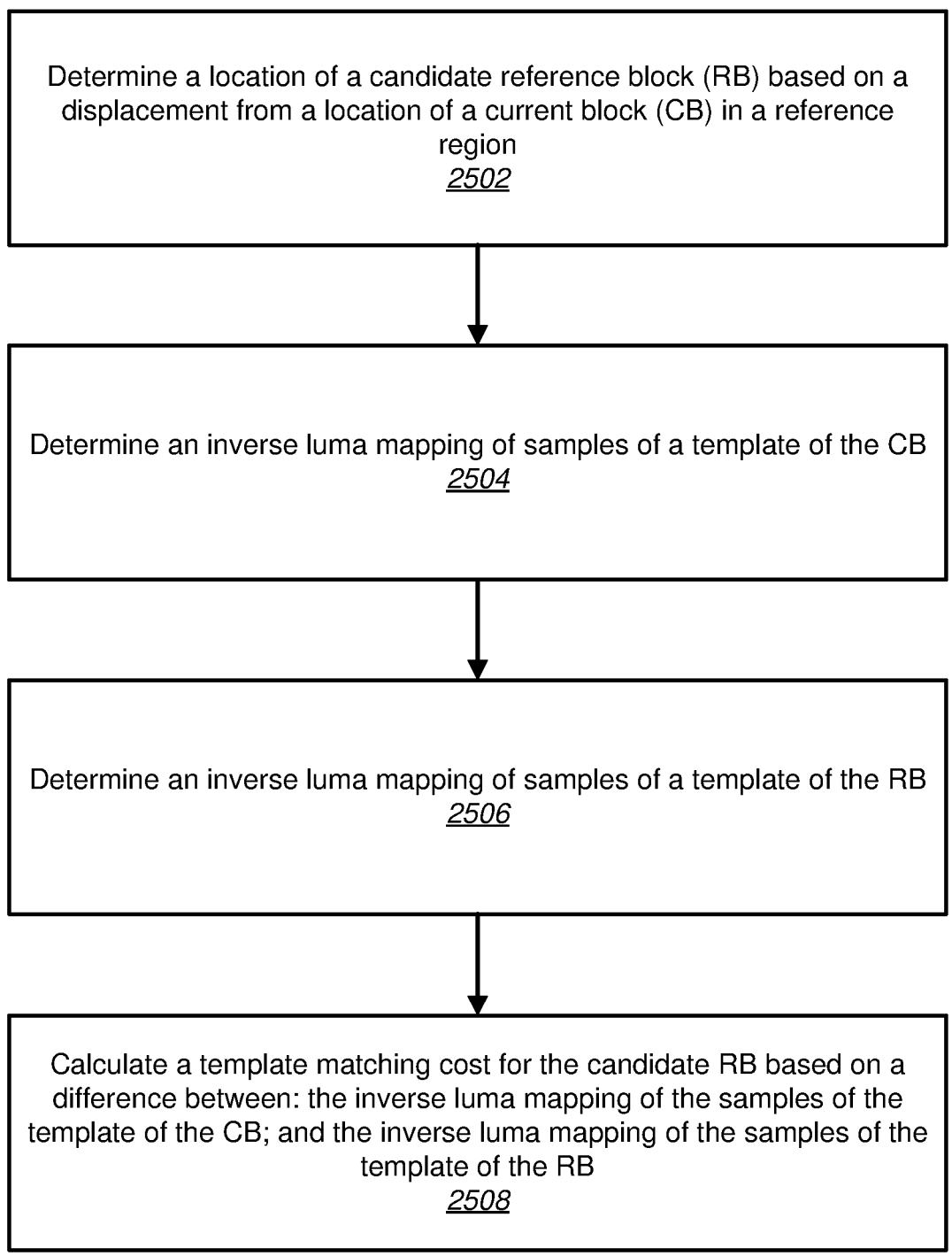
FIG. 25 shows a method for luma mapping.

FIG. 25 shows a method for luma mapping. Samples of a current block and/or samples of a reference block may be harmonized (e.g., mapped to a same domain). The mapped samples may be used to determine template matching cost. More specifically, FIG. 25 shows an example flowchart 2500 of a method for luma mapping. One or more steps of the example method shown in flowchart 2500 may be implemented by a coder. The coder may comprise an encoder (e.g., encoder 200 described herein with respect to FIG. 2) or a decoder (e.g., decoder 300 described herein with respect to FIG. 3).

At step 2502, a coder (e.g., encoder or decoder) may determine a location of a candidate reference block (RB). The location may be determined, for example, based on a displacement (e.g., as illustrated in FIG. 13B) from a location of a current block (CB) in a reference region.

At step 2504, a coder (e.g., encoder or decoder) may determine an inverse luma mapping of samples of a template of the CB. The samples of the template of the CB may be received in a luma-dependent chroma residue scaling (LMCS) mapped domain, for example, prior to the determining the inverse luma mapping. The determining the inverse luma mapping of the samples of the template of the CB may be based on receiving previously inverse luma mapped samples in a spatial domain from a buffer.

At step 2506, a coder (e.g., encoder or decoder) may determine an inverse luma mapping of samples of a template of the RB. The samples of the template of the RB may be received in an LMCS mapped domain, for example, prior to the determining the inverse luma mapping. The determining the inverse luma mapping of the samples of the templates of the CB and/or the RB may comprise transforming the samples into a spatial domain.

At step 2508, a coder (e.g., encoder or decoder) may determine (e.g., calculate) a template matching cost for the candidate RB. The coder (e.g., encoder or decoder) may determine (e.g., calculate) the template matching cost for the candidate RB, for example, based on a difference between: the inverse luma mapping of the samples of the template of the CB; and the inverse luma mapping of the samples of the template of the RB. The difference may be a sum of absolute differences (SAD). The difference may be a sum of absolute transformed differences (SATD).

Figure 26:
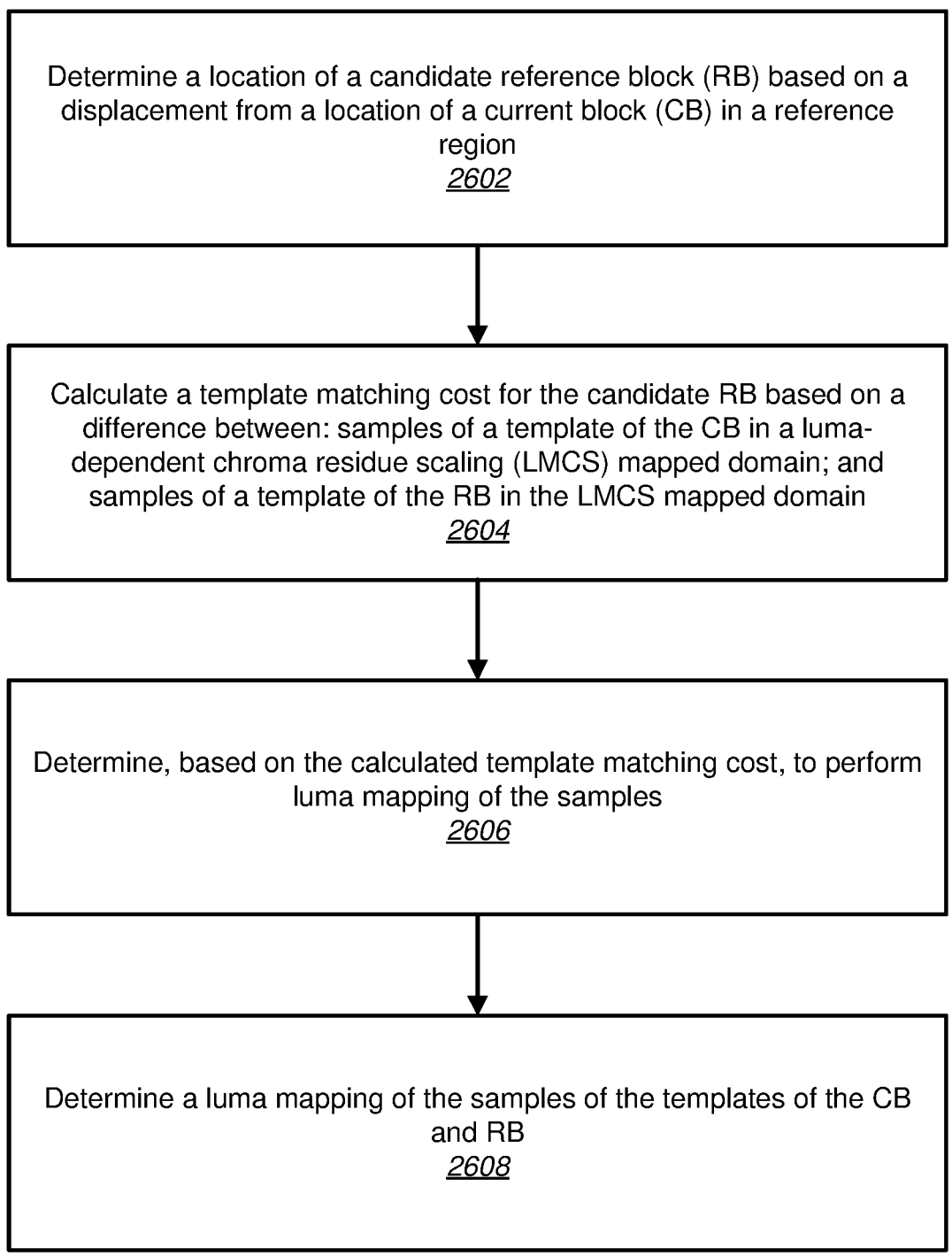
FIG. 26 shows a method luma mapping.

FIG. 26 shows a method for luma mapping. Samples of a current block and/or samples of a reference block may be harmonized (e.g., mapped to a same domain). The mapped samples may be used to determine template matching cost. More specifically, FIG. 26 shows an example flowchart 2600 of a method for luma mapping. One or more steps of the example method shown in flowchart 2600 may be implemented by a coder. The coder may comprise an encoder (e.g., encoder 200 as described herein with respect to FIG. 2) or a decoder (e.g., decoder 300 as described herein with respect to FIG. 3).

At step 2602, a coder (e.g., encoder or decoder) may determine a location of a candidate reference block (RB). The coder (e.g., encoder or decoder) may determine the location of the candidate reference block (RB), for example, based on a displacement from a location of a current block (CB) in a reference region.

At step 2604, a coder (e.g., encoder or decoder) may determine (e.g., calculate) a template matching cost for the candidate RB. The coder (e.g., encoder or decoder) may determine (e.g., calculate) the template matching cost for the candidate RB, for example, based on a difference between samples of a template of the CB in an LMCS mapped domain and samples of a template of the RB in the LMCS mapped domain. The difference may be a sum of absolute differences (SAD). The difference may be a sum of absolute transformed differences (SATD).

At step 2606, a coder (e.g., encoder or decoder) may determine, based on the calculated template matching cost, to perform luma mapping of the samples. At step 2608, a coder (e.g., encoder or decoder) may determine a luma mapping of the samples of the templates of the CB and/or the RB. The determining the luma mapping of the samples of the templates of the CB and/or the RB may further comprise transforming the samples into a spatial domain.

Figure 27:
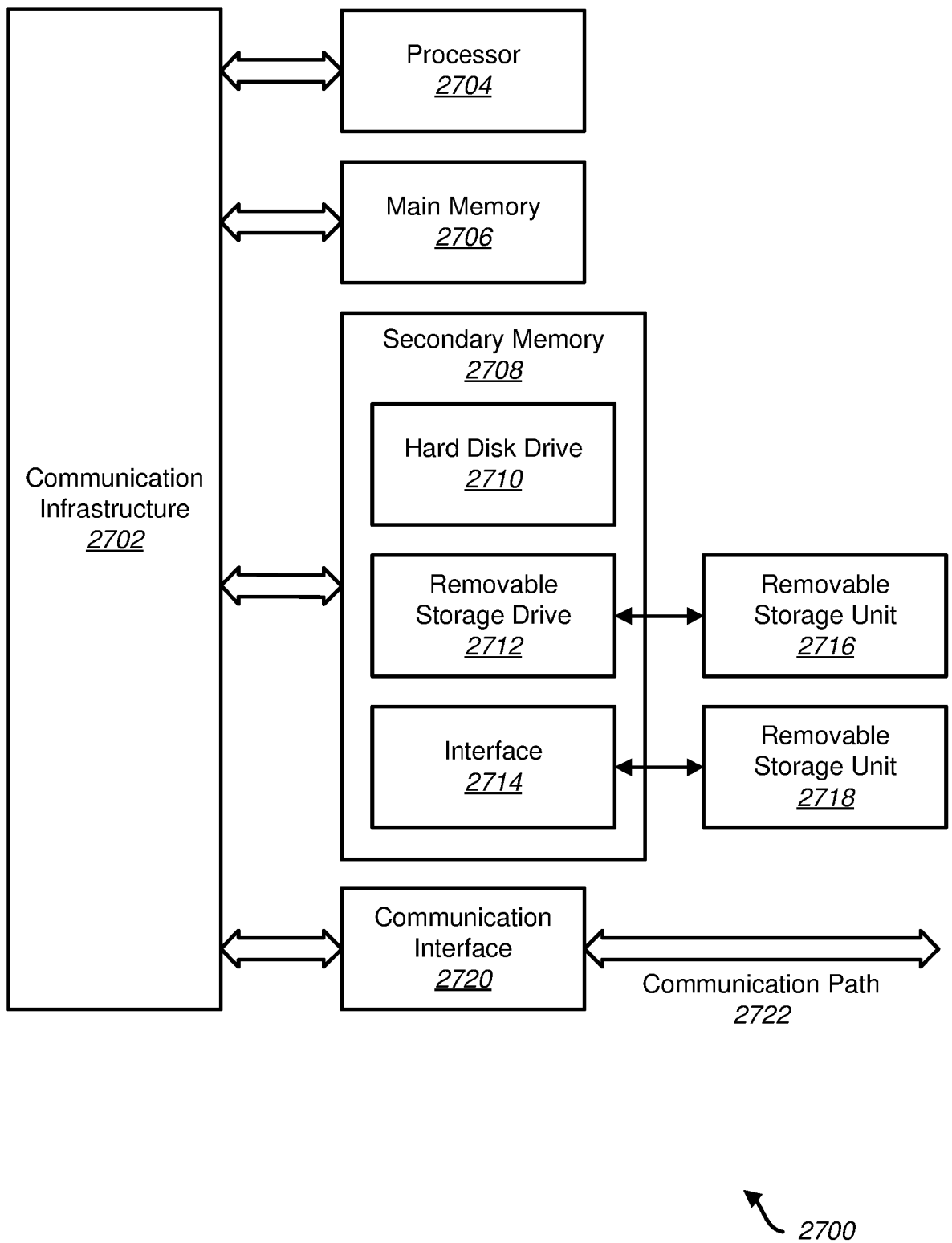
FIG. 27 shows an example of a computer system.

FIG. 27 shows an example of a computer system. For example, the example computer system 2700 shown in FIG.

27 may implement one or more of the methods described herein. For example, various devices and/or systems described herein (e.g., in FIGS. 1, 2, and 3) may be implemented in the form of one or more computer systems 2700. Furthermore, each of the steps of the flowcharts depicted in this disclosure may be implemented on one or more computer systems 2700.

The computer system 2700 may comprise one or more processors, such as a processor 2704. The processor 2704 may be a special purpose processor, a general purpose processor, a microprocessor, and/or a digital signal processor. The processor 2704 may be connected to a communication infrastructure 2702 (for example, a bus or network). The computer system 2700 may also comprise a main memory 2706 (e.g., a random access memory (RAM)), and/or a secondary memory 2708.

The secondary memory 2708 may comprise a hard disk drive 2710 and/or a removable storage drive 2712 (e.g., a magnetic tape drive, an optical disk drive, and/or the like). The removable storage drive 2712 may read from and/or write to a removable storage unit 2716. The removable storage unit 2716 may comprise a magnetic tape, optical disk, and/or the like. The removable storage unit 2716 may be read by and/or may be written to the removable storage drive 2712. The removable storage unit 2716 may comprise a computer usable storage medium having stored therein computer software and/or data.

The secondary memory 2708 may comprise other similar means for allowing computer programs or other instructions to be loaded into the computer system 2700. Such means may include a removable storage unit 2718 and/or an interface 2714. Examples of such means may comprise a program cartridge and/or cartridge interface (such as in video game devices), a removable memory chip (such as an erasable programmable read-only memory (EPROM) or a programmable read-only memory (PROM)) and associated socket, a thumb drive and USB port, and/or other removable storage units 2718 and interfaces 2714 which may allow software and/or data to be transferred from the removable storage unit 2718 to the computer system 2700.

The computer system 2700 may also comprise a communications interface 2720. The communications interface 2720 may allow software and data to be transferred between the computer system 2700 and external devices. Examples of the communications interface 2720 may include a modem, a network interface (e.g., an Ethernet card), a communications port, etc. Software and/or data transferred via the communications interface 2720 may be in the form of signals which may be electronic, electromagnetic, optical, and/or other signals capable of being received by the communications interface 2720. The signals may be provided to the communications interface 2720 via a communications path 2722. The communications path 2722 may carry signals and may be implemented using wire or cable, fiber optics, a phone line, a cellular phone link, an RF link, and/or any other communications channel(s).

A computer program medium and/or a computer readable medium may be used to refer to tangible storage media, such as removable storage units 2716 and 2718 or a hard disk installed in the hard disk drive 2710. The computer program products may be means for providing software to the computer system 2700. The computer programs (which may also be called computer control logic) may be stored in the main memory 2706 and/or the secondary memory 2708. The computer programs may be received via the communications interface 2720. Such computer programs, when executed, may enable the computer system 2700 to implement the present disclosure as discussed herein. In particular, the computer programs, when executed, may enable the processor 2704 to implement the processes of the present disclosure, such as any of the methods described herein. Accordingly, such computer programs may represent controllers of the computer system 2700.

Figure 28:
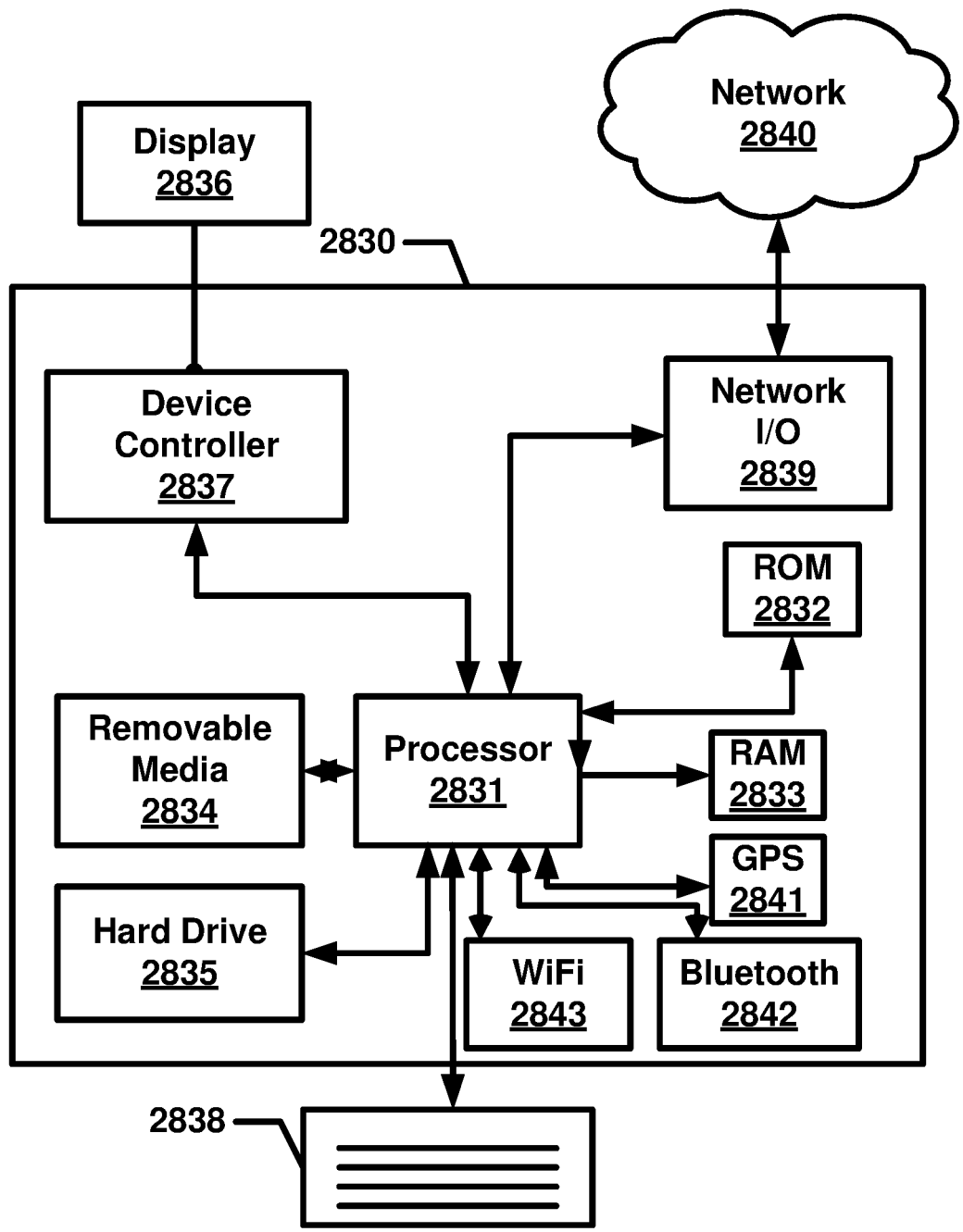
FIG. 28 shows example elements of a computing device that may be used to implement any of the various devices described herein.

FIG. 28 shows example elements of a computing device that may be used to implement any of the various devices described herein, including, for example, a source device (e.g., 102), an encoder (e.g., 200), a destination device (e.g., 106), a decoder (e.g., 300), and/or any computing device described herein. The computing device 2830 may include one or more processors 2831, which may execute instructions stored in the random-access memory (RAM) 2833, the removable media 2834 (such as a Universal Serial Bus (USB) drive, compact disk (CD) or digital versatile disk (DVD), or floppy disk drive), or any other desired storage medium. Instructions may also be stored in an attached (or internal) hard drive 2835. The computing device 2830 may also include a security processor (not shown), which may execute instructions of one or more computer programs to monitor the processes executing on the processor 2831 and any process that requests access to any hardware and/or software components of the computing device 2830 (e.g., ROM 2832, RAM 2833, the removable media 2834, the hard drive 2835, the device controller 2837, a network interface 2839, a GPS 2841, a Bluetooth interface 2842, a WiFi interface 2843, etc.). The computing device 2830 may include one or more output devices, such as the display 2836 (e.g., a screen, a display device, a monitor, a television, etc.), and may include one or more output device controllers 2837, such as a video processor. There may also be one or more user input devices 2838, such as a remote control, keyboard, mouse, touch screen, microphone, etc. The computing device 2830 may also include one or more network interfaces, such as a network interface 2839, which may be a wired interface, a wireless interface, or a combination of the two. The network interface 2839 may provide an interface for the computing device 2830 to communicate with a network 2840 (e.g., a RAN, or any other network). The network interface 2839 may include a modem (e.g., a cable modem), and the external network 2840 may include communication links, an external network, an in-home network, a provider's wireless, coaxial, fiber, or hybrid fiber/coaxial distribution system (e.g., a DOCSIS network), or any other desired network. Additionally, the computing device 2830 may include a location-detecting device, such as a global positioning system (GPS) microprocessor 2841, which may be configured to receive and process global positioning signals and determine, with possible assistance from an external server and antenna, a geographic position of the computing device 2830.

The example in FIG. 28 may be a hardware configuration, although the components shown may be implemented as software as well. Modifications may be made to add, remove, combine, divide, etc. components of the computing device 2830 as desired. Additionally, the components may be implemented using basic computing devices and components, and the same components (e.g., processor 2831, ROM storage 2832, display 2836, etc.) may be used to implement any of the other computing devices and components described herein. For example, the various components described herein may be implemented using computing devices having components such as a processor executing computer-executable instructions stored on a computer-readable medium, as shown in FIG. 28. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. The computing device may, based on a location of a current block (CB) associated with a video frame, determine a location of a candidate reference block (RB). The computing device may further, based on transforming the one or more samples, of a template of the CB, form a luma mapped domain to a spatial domain, determine a first inverse luma mapping of the one or more samples of the template of the CB. The computing device may further, based on transforming one or more samples of a template of the RB into the spatial domain, determine a second inverse luma mapping of the one or more samples of the template of the RB. The computing device may further determine a template matching cost associated with the candidate RB based on a difference between: the one or more samples of the template of the CB; and the one or more samples of the template of the RB. The computing device may determine the first inverse luma mapping is based on a slice type of the CB. The slice type may comprise at least one of: a uni-prediction slice (P-slice); or a bi-prediction slice (B-slice). The candidate RB and the CB may be from a same slice. The computing device may further receive, from a luma-dependent chroma residue scaling (LMCS) mapped domain, at least one of: the one or more samples of the template of the CB; or the one or more samples of the template of the RB. The difference may be based on at least one of: a sum of absolute differences (SAD); or a sum of absolute transformed differences (SATD). The computing device may further, based on the first inverse luma mapping, transform the one or more samples of the template of the CB from a luma-dependent chroma residue scaling (LMCS) mapped domain. The computing device may further select the candidate RB, from a plurality of candidate RBs, based on the template matching cost associated with the candidate RB; and based on the selected candidate RB, decoding the CB. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode the current block. A computer-readable medium may store instructions that, when executed, cause performance of the described method, additional operations and/or include the additional elements.

A computing device may perform a method comprising multiple operations. The computing device may, based on a location of a current block (CB) associated with a video frame, determine a location of a candidate reference block (RB). The computing device may further determine a template matching cost associated with the candidate RB based on a difference between: one or more samples of a template of the CB in a luma-dependent chroma residue scaling (LMCS) mapped domain; and one or more samples of a template of the RB in the LMCS mapped domain. The computing device may further select one or more RBs from a list of candidate RBs based on the corresponding template matching costs. The computing device may determine the luma mapping of the one or more samples of the template of the CB based on a slice type of the CB. The slice type may comprise at least one of: a uni-prediction slice (P-slice); or a bi-prediction slice (B-slice). The candidate RB and the CB may be from a same slice. The computing device may further, based on an inverse luma mapping, transform the one or more samples of the template of the CB from a luma-dependent chroma residue scaling (LMCS) mapped domain. The difference may be based on at least one of: a sum of absolute differences (SAD); or a sum of absolute transformed differences (SATD). The computing device may further select the candidate RB, from a plurality of candidate RBs, based on the template matching cost associated with the candidate RB; and based on the selected candidate RB, decode the CB. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode the current block. A computer-readable medium may store instructions that, when executed, cause performance of the described method, additional operations and/or include the additional elements.

A computing device may perform a method comprising multiple operations. The computing device may, based on a location of a current block (CB), determine a location of a candidate reference block (RB). The computing device may further, based on one or more samples of a template of the CB being in a spatial domain, determine an inverse luma mapping for one or more samples of a template of the candidate RB. The inverse luma mapping may transform the one or more samples of the template of the candidate RB to the spatial domain. The computing device may further determine a template matching cost associated with the candidate RB based on a difference between: the one or more samples of the template of the CB; and the one or more samples of the template of the candidate RB. The computing device may perform the inverse luma mapping based on a slice type of the CB. The slice type may comprise at least one of: a uni-prediction slice (P-slice); or a bi-prediction slice (B-slice). The candidate RB and the CB may be from a same slice. The computing device may further receive, from a luma-dependent chroma residue scaling (LMCS) mapped domain, at least one of: the one or more samples of the template of the CB; or the one or more samples of the template of the candidate RB. The difference may be based on at least one of: a sum of absolute differences (SAD); or a sum of absolute transformed differences (SATD). The inverse luma mapping may transform the one or more samples of the template of the CB from a luma-dependent chroma residue scaling (LMCS) mapped domain. The computing device may further select the candidate RB, from a plurality of candidate RBs, based on the template matching cost associated with the candidate RB; and based on the selected candidate RB, decode the CB. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode the current block. A computer-readable medium may store instructions that, when executed, cause performance of the described method, additional operations and/or include the additional elements.

A computing device may perform a method comprising multiple operations. The computing device may determine a location of a candidate reference block (RB) based on a displacement from a location of a current block (CB) in a reference region. The computing device may further determine an inverse luma mapping of samples of a template of the CB based on transforming the samples from a luma mapped domain to a spatial domain. The computing device may further determine an inverse luma mapping of samples of a template of the RB based on transforming the samples into the spatial domain. The computing device may further calculate a template matching cost for the candidate RB based on a difference between: the inverse luma mapping of the samples of the template of the CB; and the inverse luma mapping of the samples of the template of the RB. The computing device may determine the inverse luma mapping of the samples of the template of the CB based on a type of a slice for the CB. The type of the slice may be a uni-prediction slice (P-slice) or a bi-prediction slice (B-slice). The RB and CB may be from the same slice. Prior to the determining the inverse luma mapping, the samples of the template of the CB may be received in a luma-dependent chroma residue scaling (LMCS) mapped domain. Prior to the determining the inverse luma mapping, the samples of the template of the RB may be received in a LMCS mapped domain. The computing device may determine the inverse luma mapping of the samples of the template of the CB based on receiving previously inverse luma mapped samples in a spatial domain from a buffer. The computing device may determine the inverse luma mapping of the samples of the templates of the CB and the RB by transforming the samples from a luma mapped domain to a spatial domain. The difference may a sum of absolute differences (SAD). The difference may be a sum of absolute transformed differences (SATD). The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to code the current block. A computer-readable medium may store instructions that, when executed, cause performance of the described method, additional operations and/or include the additional elements.

A computing device may perform a method comprising multiple operations. The computing device may determine a location of a candidate reference block (RB) based on a displacement from a location of a current block (CB) in a reference region. The computing device may further calculate a template matching cost for the candidate RB based on a difference between: samples of a template of the CB in a luma-dependent chroma residue scaling (LMCS) mapped domain; and samples of a template of the RB in the LMCS mapped domain. The computing device may further select reference blocks from a list of candidate reference blocks based on the template matching costs. The computing device may further determine a luma mapping of the samples of the templates of the CB and RB. The computing device may determine the luma mapping of the samples of the template of the CB based on a type of a slice for the CB. The type of the slice may be a uni-prediction slice (P-slice) or a bi-prediction slice (B-slice). The RB and CB may be from the same slice. Prior to the determining the luma mapping, the samples of the template of the CB may be received in a luma-dependent chroma residue scaling (LMCS) mapped domain. Prior to the determining the luma mapping, the samples of the template of the RB may be received in a LMCS mapped domain. The computing device may determine the luma mapping of the samples of the template of the CB based on receiving previously luma mapped samples in a spatial domain from a buffer. The computing device may determine the luma mapping of the samples of the templates of the CB and the RB by transforming the samples into a spatial domain. The difference may be a sum of absolute differences (SAD). The difference may be a sum of absolute transformed differences (SATD). The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to code the current block. A computer-readable medium may store instructions that, when executed, cause performance of the described method, additional operations and/or include the additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated when its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks. Features of the disclosure may be implemented in hardware using, for example, hardware components such as application-specific integrated circuits (ASICs) and gate arrays. Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
    based on a location of a current block (CB) associated with video determining a location of a candidate reference block (RB);
    based on transforming one or more samples, of a template of the CB, from a luma mapped domain to a spatial domain, determining a first inverse luma mapping of the one or more samples of the template of the CB;
    based on transforming one or more samples, of a template of the RB, from a luma mapped domain to the spatial domain, determining a second inverse luma mapping of the one or more samples of the template of the RB; and
    determining a template matching cost associated with the candidate RB based on a difference between:
        the one or more samples of the template of the CB; and
        the one or more samples of the template of the RB.

2. The method of claim 1, wherein the determining the first inverse luma mapping is based on a slice type for the CB, wherein the slice type comprises at least one of:
    a uni-prediction slice (P-slice); or
    a bi-prediction slice (B-slice).

3. The method of claim 1, wherein the candidate RB and the CB are from a same slice.

4. The method of claim 1, further comprising:
transforming the one or more samples of the template of the RB from a luma-dependent chroma residue scaling (LMCS) mapped domain.

5. The method of claim 1, wherein the difference is based on at least one of:
a sum of absolute differences (SAD); or
a sum of absolute transformed differences (SATD).

6. The method of claim 1, further comprising:
transforming the one or more samples of the template of the CB from a luma-dependent chroma residue scaling (LMCS) mapped domain.

7. The method of claim 1, further comprising:
selecting the candidate RB, from a plurality of candidate RBs, based on the template matching cost associated with the candidate RB; and
based on the selected candidate RB, decoding the current CB.

8. A computing device comprising:
one or more processors; and
memory storing instructions that, when executed by the one or more processors, cause the computing device to:
based on a location of a current block (CB) associated with video content, determine a location of a candidate reference block (RB);
based on transforming one or more samples, of a template of the CB, from a luma mapped domain to a spatial domain, determine a first inverse luma mapping of the one or more samples of the template of the CB;
based on transforming one or more samples, of a template of the RB, from a luma mapped domain to the spatial domain, determine a second inverse luma mapping of the one or more samples of the template of the RB; and
determine a template matching cost associated with the candidate RB based on a difference between:
the one or more samples of the template of the CB; and
the one or more samples of the template of the RB.

9. The computing device of claim 8, wherein the instructions, when executed by the one or more processors, cause the computing device to determine the first inverse luma mapping based on a slice type for the CB, wherein the slice type comprises at least one of:
a uni-prediction slice (P-slice); or
a bi-prediction slice (B-slice).

10. The computing device of claim 8, wherein the candidate RB and the CB are from a same slice.

11. The computing device of claim 8, wherein the instructions, when executed by the one or more processors, further cause the computing device to transform the one or more samples of the template of the RB from a luma-dependent chroma residue scaling (LMCS) mapped domain.

12. The computing device of claim 8, wherein the difference is based on at least one of:
a sum of absolute differences (SAD); or
a sum of absolute transformed differences (SATD).

13. The computing device of claim 8, wherein the instructions, when executed by the one or more processors, further cause the computing device to transform the one or more samples of the template of the CB from a luma-dependent chroma residue scaling (LMCS) mapped domain.

14. A non-transitory computer-readable medium storing instructions that, when executed, cause:
based on a location of a current block (CB) associated with video content, determining a location of a candidate reference block (RB);
based on transforming one or more samples, of a template of the CB, from a luma mapped domain to a spatial domain, determining a first inverse luma mapping of the one or more samples of the template of the CB;
based on transforming one or more samples, of a template of the RB, from a luma mapped domain to the spatial domain, determining a second inverse luma mapping of the one or more samples of the template of the RB; and
determining a template matching cost associated with the candidate RB based on a difference between:
the one or more samples of the template of the CB; and
the one or more samples of the template of the RB.

15. The non-transitory computer-readable medium of claim 14, wherein the instructions, when executed, cause determining the first inverse luma mapping based on a slice type for the CB, wherein the slice type comprises at least one of:
a uni-prediction slice (P-slice); or
a bi-prediction slice (B-slice).

16. The non-transitory computer-readable medium of claim 14, wherein the candidate RB and the CB are from a same slice.

17. The non-transitory computer-readable medium of claim 14, wherein the instructions, when executed, further cause transforming the one or more samples of the template of the RB from a luma-dependent chroma residue scaling (LMCS) mapped domain.

18. The non-transitory computer-readable medium of claim 14, wherein the difference is based on at least one of:
a sum of absolute differences (SAD); or
a sum of absolute transformed differences (SATD).

19. A system comprising:
a first computing device comprising:
one or more processors; and
memory storing instructions that, when executed by the one or more processors of the first computing device, cause the first computing device to:
based on a location of a current block (CB) associated with video content, determine a location of a candidate reference block (RB);
based on transforming one or more samples, of a template of the CB, from a luma mapped domain to a spatial domain, determine a first inverse luma mapping of the one or more samples of the template of the CB;
based on transforming one or more samples, of a template of the RB, from a luma mapped domain to the spatial domain, determine a second inverse luma mapping of the one or more samples of the template of the RB; and
determine a template matching cost associated with the candidate RB based on a difference between:
the one or more samples of the template of the CB; and
the one or more samples of the template of the RB; and
a second computing device comprising:
one or more processors; and
memory storing instructions that, when executed by the one or more processors of the second computing device, cause the second computing device to:
code the CB.

20. The system of claim 19, wherein the instructions stored in the memory of the first computing device, when executed by the one or more processors of the first computing device, cause the first computing device to:
determine the first inverse luma mapping based on a slice type for the CB, wherein the slice type comprises at least one of:
a uni-prediction slice (P-slice); or
a bi-prediction slice (B-slice).

\* \* \* \* \*